United States Patent
Kim et al.

(10) Patent No.: US 7,659,945 B2
(45) Date of Patent: Feb. 9, 2010

(54) COLOR REPRODUCTION METHOD AND SYSTEM, AND VIDEO DISPLAY METHOD AND DEVICE USING THE SAME

(75) Inventors: Hee Chul Kim, Gumi-si (KR); Kyu Ik Sohng, Daegu-si (KR); Eun Su Kim, Daegu-si (KR); Dae Won Kim, Daegu-si (KR); Dong Won Ryu, Daegu-si (KR); Jong Sun Park, Daegu-si (KR); Jong Keun Shin, Gumi-si (KR)

(73) Assignee: LG Electronics Inc., Seoul (KR)

( * ) Notice: Subject to any disclaimer, the term of this patent is extended or adjusted under 35 U.S.C. 154(b) by 90 days.

(21) Appl. No.: 11/723,890

(22) Filed: Mar. 22, 2007

(65) Prior Publication Data

US 2007/0171309 A1 Jul. 26, 2007

Related U.S. Application Data

(62) Division of application No. 10/439,316, filed on May 16, 2003.

(30) Foreign Application Priority Data

May 22, 2002 (KR) ................................ 2002-28437

(51) Int. Cl.
*H04N 9/69* (2006.01)
*H04N 5/202* (2006.01)
(52) U.S. Cl. .................................... 348/675; 348/674
(58) Field of Classification Search .......... 348/674–677
See application file for complete search history.

(56) References Cited

U.S. PATENT DOCUMENTS

| 5,196,924 A | | 3/1993 | Lumelsky et al. |
| 5,258,829 A | * | 11/1993 | Matsunaga et al. .......... 348/659 |
| 5,589,889 A | | 12/1996 | Kawaoka |

(Continued)

FOREIGN PATENT DOCUMENTS

JP 7322181 12/1995

(Continued)

OTHER PUBLICATIONS

German Search Report dated Jul. 3, 2008.

*Primary Examiner*—M. Lee
(74) *Attorney, Agent, or Firm*—KED & Associates, LLP

(57) ABSTRACT

A color reproduction correcting system and method, and a video display device and method can reproduce original color by considering signal source and display device. Each signal source information and each display device information can be stored. The signal source and the display device, which are currently used (e.g., corrected), can be determined, for example, by a user selection. In one embodiment, the signal provided from a transmission side can be inverse gamma-corrected based on a corresponding signal source, and a colorimetric error of the inverse gamma-corrected signal is preferably corrected using corresponding signal source information and display device information. The corrected colorimetric error signal can be gamma-corrected based on a corresponding display device and then can be displayed on the corresponding display device.

11 Claims, 15 Drawing Sheets

U.S. PATENT DOCUMENTS

| | | | |
|---|---|---|---|
| 5,710,594 A | | 1/1998 | Kim |
| 5,822,009 A | * | 10/1998 | Keating et al. .............. 348/458 |
| 6,359,663 B1 | | 3/2002 | Gadeyne et al. |
| 6,441,870 B1 | | 8/2002 | Rapaich |
| 7,088,478 B2 | * | 8/2006 | Shirochi et al. ............. 358/519 |

FOREIGN PATENT DOCUMENTS

| | | |
|---|---|---|
| JP | 2002-041016 | 2/2002 |
| WO | WO 00/38413 | 6/2000 |

* cited by examiner

▲ : Position of NTSC reference white
● : Position of LCD_PJT reference white
■ : Position of SMPTE reference white

Fig. 14

| Signal source | RGB primaries (Standard phosphor) | | | Reference White | Gamma (γ) |
|---|---|---|---|---|---|
| | | Red | Green | Blue | CIE IIIC (6774K) | |
| NTSC Primaries | x | 0.67 | 0.21 | 0.14 | 0.3101 | $\frac{1}{0.4545} = 2.2$ |
| | y | 0.33 | 0.71 | 0.08 | 0.3162 | |
| | z | 0 | 0.08 | 0.78 | 0.3737 | |
| | | Red | Green | Blue | CIE D65 (6504K) | γ |
| PAL Primaries | x | 0.63 | 0.31 | 0.155 | 0.3127 | 2.8 |
| | y | 0.34 | 0.595 | 0.07 | 0.319 | |
| | z | 0.03 | 0.095 | 0.775 | 0.3583 | |
| Note: Although the PAL standards specify a gamma of 2.8, a value of 2.2 is actually used | | | | | | |
| | | Red | Green | Blue | CIE D65 (6504K) | γ |
| EBU Primaries | x | 0.64 | 0.29 | 0.15 | 0.3127 | 2.8 |
| | y | 0.33 | 0.6 | 0.06 | 0.319 | |
| | z | 0.03 | 0.11 | 0.79 | 0.3583 | |
| Note: EBU Tech.3123, 625/50 systems | | | | | | |
| | | Red | Green | Blue | CIE D65 (6504K) | γ |
| SMPTE RP 145 Primaries | x | 0.63 | 0.31 | 0.155 | 0.3127 | $\frac{1}{0.4545} = 2.222$ |
| | y | 0.34 | 0.595 | 0.07 | 0.319 | |
| | z | 0.03 | 0.095 | 0.775 | 0.3583 | |
| Note: 525/59.94 systems, and for 1125/60HDTV according to SMPTE 240M | | | | | | |
| | | Red | Green | Blue | CIE D65 (6504K) | γ |
| ITU-Rec.709 Primaries | x | 0.64 | 0.3 | 0.15 | 0.3127 | $\frac{1}{0.4545} = 2.222$ |
| | y | 0.33 | 0.6 | 0.06 | 0.319 | |
| | z | 0.03 | 0.1 | 0.79 | 0.3583 | |
| Note: ITU-R BT.709 (formerly CCIR Rec.709), Standard of ATSC digital TV | | | | | | |
| | | Red | Green | Blue | CIE D65 (6504K) | γ |
| sRGB [34],[35] Primaries | x | 0.64 | 0.3 | 0.15 | 0.3127 | 2.4 |
| | y | 0.33 | 0.6 | 0.06 | 0.319 | |
| | z | 0.03 | 0.1 | 0.79 | 0.3583 | |
| Note: ITU-R BT.709, Standard of Internet color systems | | | | | | |

COLOR REPRODUCTION METHOD AND SYSTEM, AND VIDEO DISPLAY METHOD AND DEVICE USING THE SAME

This application is a Divisional of U.S. patent application Ser. No. 10/439,316, filed May 16, 2003, which claims priority under 35 U.S.C. §119 from Korean Application Serial No. 28437/2002, filed May 22, 2002, the entire disclosures of which are hereby incorporated by reference.

BACKGROUND OF THE INVENTION

1. Field of the Invention

The present invention relates to a color reproduction method and system, and a video display device using the same.

2. Background of the Related Art

Generally, a color television system includes a broadcasting station for transmitting broadcast signals that are produced using cameras, and a color television set for processing and reproducing the broadcast signals transmitted from the broadcasting station to allow the audience to see and hear sounds and pictures.

In the development of the color television system, the goal is to obtain the reproduced video proportional to luminance of an original object and to reproduce color equal to a chromaticity coordinate of the original object. For example, in case of a National Television System Committee (NTSC) color television system that employs NTSC standard, a broadcasting camera for capturing videos obtains an ideal imaging characteristic based on an NTSC standard monitor, and a color television set reproduces the same chromaticity coordinate as an original object irradiated by an illuminant C.

However, in most color television sets, reference white and phosphor have been changed differently from the NTSC standard. The reason is that a screen was dark because of a low luminous efficiency of phosphor at that time when the NTSC standard was established, and thus a phosphor with high luminous efficiency was used. At the same time, there were attempts to realize much brighter screen by increasing a chromaticity temperature. For these reasons, American and Japanese television set manufacturers set 9300K as a chromaticity temperature of the reference white since the late 1950's when it began to use P22-series phosphors, and have manufactured the television sets that could achieve a color reproduction according to the chromaticity temperature of the reference white. Thereafter, in Korea or Japan where about 6000K daylight fluorescent lamps are mainly used as indoor illuminators, the television sets tend to be manufactured under conditions that the reference white is set randomly between 11000K to 13000K, which is higher than 9300K.

While a reference white, which is set to the broadcasting station and in particular to the broadcasting camera, is fixed, a reference white of the television set, particularly the display device, is not fixed but increased gradually. Therefore, the videos reproduced on the display device are distorted because of a difference between both reference whites.

Meanwhile, like aerial-wave broadcasting signals and component signals, signal sources of the television sets also have different standards from each other and various sources are actually used. Here, the aerial-wave broadcasting signals are generated from NTSC broadcasting or HDTV broadcasting, and component signals are generated from DVD or digital still camera.

Further, when transmission side of the television set performs the color reproduction without considering gamma corrected characteristic, distortions can occur in the color reproduction, and thus reproduction fidelity with respect to original colors is degraded. In addition, one important problem may be a colorimetric error, which is caused by discord between phosphor coordinates of a standard monitor of the broadcasting camera and those of the television set.

In addition to general aerial-wave broadcasting signals, the current television sets can compatibly process variously formatted signal sources (in other words, a TV signal source, a PC signal source, a component signal source, etc), such as HDTV broadcasting signals, cable broadcasting signals, PC signals, DVD signals, VCR signals, etc. Further, in addition to various conventional CRT-based display devices (Cathode Ray Tube (CRT), Cathode Display Tube (CDT), Cathode Picture Tube (CPT), etc.), flat-panel display devices (Liquid Crystal Display (LCD), Plasma Display Panel (PDP), Field Emission Display (FED), etc.) tend to be selectively applied to the display devices of the television sets. As described above, since all various signal sources and display devices are not considered, improved or optimal color reproduction can not be achieved because of the video distortion.

Related art methods for processing video signals according to signal sources and disadvantages thereof will now be described. FIG. 1 is a schematic view of a related art video display device for processing TV signal.

Referring to FIG. 1, the related art video display device (e.g., TV set) includes a TV signal processor 10 for dividing TV signal into an audio signal and a video signal through tuning/detecting/demodulating operations of the TV signal, and an A/V switch 11 for switching the audio and video signals divided at the TV signal processor 10. A 3D comb filter 12 is for separating luminance and color signals Y/C from the video signal outputted from the A/V switch 11. A decoder 13 is for converting the luminance and color signals Y/C into a luminance and color difference signals Y, U and V, and a video/synchronization processor 14 is for performing a matrix conversion for a color space conversion with respect to the luminance and color difference signals converted at the decoder 13. An ADC 15 is for converting the luminance and color difference signals into digital video signals, a video processor 16 is for converting the digital video signals into color signals R', G' and B', and a video output unit 17 is for outputting the color signals R', G' and B' converted (e.g. from Y, U, V) at the video processor 16 to a display device (not shown). However, in case the luminance and color difference signals are the NTSC TV signal and A/V signals, the video/synchronization processor 14 bypasses them.

As shown in FIG. 4, when the NTSC TV signal is displayed on the display device, a color reproduction area of the signal source (i.e., the broadcasting camera) is much different from that of the display device. Thus, the original signal provided in the signal production is difficult to reproduce equally on the display device for at least reasons described below.

According to NTSC standard, an illuminant C is defined as a reference white of a camera (i.e., the signal source of TV signal). Here, the illuminant C has a color temperature of 6774K and a chromaticity coordinate given by (xws, yws, zws)=(0.3101, 0.3162, 0.337). At this time, according the definition of standard phosphor coordinates of the NTSC standard camera, standard phosphor coordinates of red, green and blue colors (R, G, B) are given by (xrs, yrs, zrs)=(0.67, 0.33, 0.00), (xgs, ygs, zgs)=(0.21, 0.71, 0.08), and (xbs, ybs, zbs)=(0.14, 0.08, 0.78), respectively.

On the contrary, the television sets have different reference white and phosphor according to the kind of display devices. For example, in case of 60" a LCD PJT television set, its reference white has a color temperature of 9300K and a chromaticity coordinate given by (xwd, ywd)=(0.283, 0.297)

and phosphor coordinates of red, green and blue colors R, G and B are given by (xrd, yrd, zrd)=(0.645, 0.35, 0.005), (xgd, ygd, ygd)=(0.279, 0.714, 0.007), and (xbd, ybd, zbd)=(0.136, 0.066, 0.798), respectively. Accordingly, the phosphor coordinates (G) of the display device are very different from the NTSC standard phosphor coordinates or digital television (TV) standard phosphor coordinates.

FIG. 4 is a diagram showing a color reproduction area and a position of the reference white according to a general signal source and a general display device. The NTSC signal source and the SMPTE signal source used as signal sources, and LCD is used as a display device.

As shown in FIG. 4, since the color reproduction area of the signal source is different from that of the display device, the original signal provided in the signal production is very difficult to reproduce equally on the display device. Additionally, since a standard gamma of the NTSC TV signal source, as shown in FIG. 14, is 2.2, the NTSC TV signal source is processed to have a characteristic of FIG. 13A and then transmitted. However, unlike a CRT, the LCD PJT television set has a S-shape gamma characteristic curve.

As described above, in case of NTSC TV signal, since reference white, phosphor coordinate and camera gamma processing of the signal sources are different from those of the display device, it is very difficult to achieve desired color reproduction. Thus, the colorimetric error occurs so that the video is displayed unnaturally in color.

FIG. 2 is a schematic view of a related art video display device for processing component signal. The component signal source can include DVD signal and DTV signal.

Referring to FIG. 2, the related art video display device includes a component signal processor 20 for processing component signals Y, PB and Pr, a video/synchronization processor 21 for performing a matrix conversion for a color space conversion with respect to the component signals Y, Pb and Pr outputted from the component signal processor 20, and an ADC 22 for converting a luminance signal Y and color signals Cb and Cr, which are outputted from the video/synchronization processor 21, into digital video signals. A video processor 23 is for processing the digital video signals into color signals R', G' and B', and a video output unit 24 is for outputting the color signals R', G' and B' to a display device.

According to ITU-R BT.709 standard (refer to FIG. 14), an illuminant D65 is defined as a reference white of the component signal source. The illuminant D65 has a color temperature of 6504K and a chromaticity coordinate given by (xws, yws, zws)=(0.3127, 0.3290, 0.3583). At this time, standard phosphor coordinates of red, green and blue colors R, G and B are given by (xrs, yrs, zrs)=(0.64, 0.33, 0.03), (xgs, ygs, zgs)=(0.30, 0.60, 0.10), and (xbs, ybs, zbs)=(0.15, 0.06, 0.79), respectively. Additionally, as shown in FIG. 14, DTV signal is processed with standard gamma of 2.222 and then transmitted.

At this time, the display device uses 9300K as the reference white and the phosphor coordinates are equal to the above. Accordingly, in case the component signals are processed at the related art television set and displayed thereon, the same problems can occur as described in the system of FIG. 1.

FIG. 3 is a schematic view of a related art video display device for processing PC signal. Referring to FIG. 3, the related art video display device includes a PC signal processor 30 for processing PC signals, a video/synchronization processor 31 for performing a matrix conversion for a color space conversion with respect to the PC signal outputted from the PC signal processor 30 and an ADC 32 for converting a received luminance signal Y and color signals Cb and Cr into digital video signals. The PC signals R, G and B is outputted to the video/synchronization processor 31, and the video/synchronization processor 31 performs a matrix conversion with respect to the PC signals R, G and B to output the luminance signal Y and the color signals Cb and Cr. A video processor 33 is for processing the digital video signals into color signals R', G' and B', and a video output unit 34 for formatting and outputting the color signals R', G' and B' to a display device.

According to sRGB standard (refer to FIG. 14), an illuminant D65 is defined as a reference white of the PC signal source. Here, the illuminant D65 has a color temperature of 6504K and a chromaticity coordinate given by (xws, yws, zws)=(0.3127, 0.3290, 0.3583). At this time, standard phosphor coordinates of red, green and blue colors R, G and B are given by (xrs, yrs, zrs)=(0.64, 0.33, 0.03), (xgs, ygs, zgs)=(0.30, 0.60, 0.10), and (xbs, ybs, zbs)=(0.15, 0.06, 0.79), respectively. As shown in FIG. 14, DTV signal is obtained through the standard gamma processing of 2.222.

Meanwhile, the display device uses 9300K as the reference white and the phosphor coordinates are equal to the above. Of course, the reference white and the phosphor coordinates of the display devices are changed according to the kind of the display devices as described above.

In case of PC signal, as described above, the colorimetric error occurs because of differences of the reference white and the phosphor coordinates between the signal source and the display device. Accordingly, the colorimetric error causes the video to be displayed incorrectly or unnaturally in color.

In the above-described signal processing methods of the related art video display devices, when signals that are generated under conditions of different reference white and phosphor coordinates at respective signal formats are displayed, the colorimetric errors occur because the reference white and phosphor coordinates of the display device were not considered. Additionally, when the gamma processed signals of the signal source are displayed without considering the gamma characteristic of the display device, the colorimetric error occurs.

In addition, the colorimetric error can occur because the standard phosphor coordinates of signal source such as TV signal, component signal and PC signals are different from those of the display devices such as CRT, CPT, LCD and PDP. In other words, the colorimetric error may be caused by discord of phosphor coordinates between the signal source and the display device. Further, the colorimetric error can occur because of a difference of gamma characteristics between the signal source and the display device.

As described above, related art video display devices have various disadvantages. Related art video display devices can receive the signal sources that have different standard phosphors and different reference white and are differently gamma-processed, and display them on the display devices that have different standard phosphors and different reference white and are differently gamma-processed. As a result, there is a long felt demand for an apparatus that can reduce the reproduction error by considering various formats of signal sources and various display devices.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a color reproduction correcting system and method that substantially obviate one or more problems caused by limitations and disadvantages of the related art.

Another object of the present invention to provide a color reproduction correcting system and method that is capable of reducing a color reproduction error.

Another object of the present invention to provide a video display device and method that is capable of solving a color reproduction error and securing reliability.

To achieve at least the above objects in a whole or in part, in an aspect of the present invention, there is provided a color reproduction correcting system that includes a color reproduction correcting system including a circuit for performing an inverse gamma correction to an input video signal according to a signal source, and a circuit for performing a gamma correction to the corrected inverse gamma signal according to a display device.

To further achieve the above objects in a whole or in part in another aspect of the present invention, there is provided a color reproduction correcting system that includes a color reproduction correcting system including device for performing a first gamma correction to an input video signal according to a signal source, device for correcting a colorimetric error with respect to the corrected gamma signal, and device for performing a second gamma correction to the corrected colorimetric error signal according to a display device.

The colorimetric error can include a difference between a coordinate value of a reference white with respect to the signal source and a coordinate value of a reference white with respect to the display device. The colorimetric error can include a difference between a coordinate value of a phosphor with respect to the signal source and a coordinate value of a phosphor with respect to the display device. The colorimetric error can be corrected by a matrix conversion between the signal source and the display device.

To further achieve the above objects in a whole or in part in another aspect of the present invention, there is provided a video display device that includes an input signal processor that modifies a signal provided from a transmission side to make a predetermined video signal, a plurality of first gamma correctors that operate on the processed video signal according to types of signal sources, a first switching circuit that correlates a signal corresponding to a predetermined signal source type among the first corrected gamma signals, an error correction circuit for correcting colorimetric error with respect to the correlated signal, a plurality of second gamma correctors that operate on the corrected colorimetric error signal according to types of display devices, a second switching circuit that correlates a signal corresponding to a predetermined display device type among the gamma-corrected signals, and a display that displays the signal correlated by the second switching.

To further achieve the above objects in a whole or in part in accordance with another aspect of the present invention, there is provided a color reproduction correcting method that includes performing a first gamma correction to an input video signal according to a signal source, correcting a colorimetric error with respect to the first gamma corrected signal, and performing a second gamma correction to the corrected colorimetric error signal according to a display device.

To further achieve the above objects in a whole or in part in accordance with another aspect of the present invention, there is provided a video display method that includes processing an input signal provided from a transmission side to make a predetermined video signal, performing a first gamma correction to the processed video signal according to kinds of signal sources, performing first selecting a signal corresponding to a predetermined signal source among the first corrected gamma signals, correcting a colorimetric error with respect to selected signal, performing second selecting a signal corresponding to a predetermined display device among the colorimetric and gamma corrected signals, and displaying the signal selected by the second selecting.

To further achieve the above objects in a whole or in part in accordance with another aspect of the present invention, there is provided a color reproduction correcting system that includes a gamma correction circuit configured to perform gamma correction on a video signal according to a signal source and a display device.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 14 shows exemplary standard specifications of general signal sources.

DETAILED DESCRIPTION OF PREFERRED EMBODIMENTS

Figure 5:
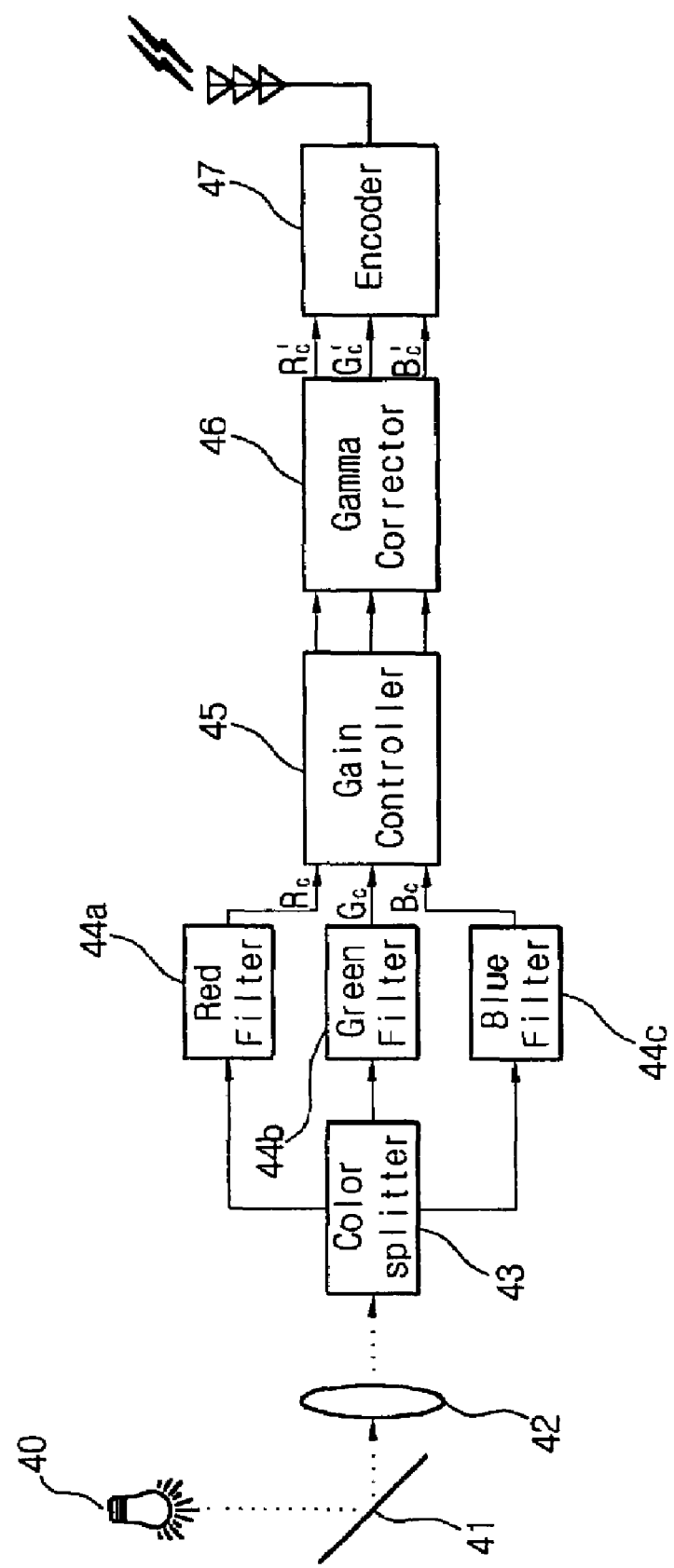
FIG. 5 is a block diagram showing an exemplary transmission-side camera that processes color signals in a color television system.

A procedure to process color signals in transmitting camera in color television system will now be described. FIG. 5 is a block diagram showing an exemplary transmitting camera of a color television system in which color signals are processed. As shown in FIG. 5, the light generated by an illuminant 40 is irradiated to an object 41. Here, a video is obtained from the light reflected from the object 41 by a lens 42. The obtained video can be converted into color signals Rc, Gc and Bc by a color splitter 43 and R, G and B optical filters 44a, 44b and 44c.

The converted color signals Rc, Gc and Bc are amplified with a predetermined gain by a gain controller 45, and corrected into gamma-corrected signals Rc', Gc' and Bc' by a gamma corrector 46 so that the gamma-corrected signals Rc', Gc' and Bc' are outputted. The gamma-corrected signals Rc', Gc' and Bc' are encoded by an encoder and transmitted through an antenna.

Accordingly, stimuli X, Y and Z of the original objects 41 inputted into the camera are converted into the color signals Rc, Gc and Bc by a color splitter 43 and R, G and B optical filters 44a, 44b and 44c. In an NTSC type camera, the gain controller 45 adjusts white balance so that the reference white of a standard monitor is illuminant C of 6774K.

The adjusted color signals Rc, Gc and Bc are corrected into the gamma-corrected signals Rc', Gc' and Bc' and the encoder 47 makes composite video signal and transmits them. In the NTSC type camera, the gamma corrector 46 is processed with gamma correction of 2.2.

Similarly, in a camera, to obtain gamma-corrected signals Rc', Gc' and Bc' of the camera from the color stimuli X, Y and Z of the original object 41, a phosphor of the standard monitor to be applied to each camera, each coordinate of the reference white and standard gamma are required.

The phosphor of a signal source, each coordinate of the reference white and the standard gamma are recommended in a Standard regulation or specification for each signal source. However, the phosphor, each coordinate of the reference white and the standard gamma depend on each of the signal sources. The color signals made of different values are inputted to a video display device.

Generally, the reliability of color in color televisions or HDTV systems can be maintained by setting the signal source and the display device to the equal reference white and phosphor characteristic and the color reproduction error can be also reduced. However, since the reference white of the current television set is set to a color temperature higher than that of the signal source to realize brighter video, a greater color reproduction error occurs. Generally, the reliability of color in color televisions or HDTV systems can be maintained by setting the signal source and the display device to the equal reference white and phosphor characteristic and the color reproduction error can be also reduced. However, since the reference white of the current television set is set to a color temperature higher than that of the signal source to realize brighter video, a greater color reproduction error occurs.

Accordingly, when the signal sources that follow different standard regulations are inputted to a specific video display device, the specific video display device makes colorimetric errors since each coordinate of the reference white of the signal source, the phosphor and the standard gamma value depend on each of the signal sources are different from those of a specific video display device. In addition, today, various display components are employed in the video display device and the reference white, the phosphor and the gamma value of the employed display components can be different from each other. So, the colorimetric errors become more serious or frequent.

Accordingly, in order to secure the color reproduction performance and reliability, preferred embodiments of color reproduction methods and video display devices should consider characteristics of both different signal sources and different display devices. Preferred embodiments according to the present invention can solve or reduce the above-described problems or disadvantages.

Figure 6:
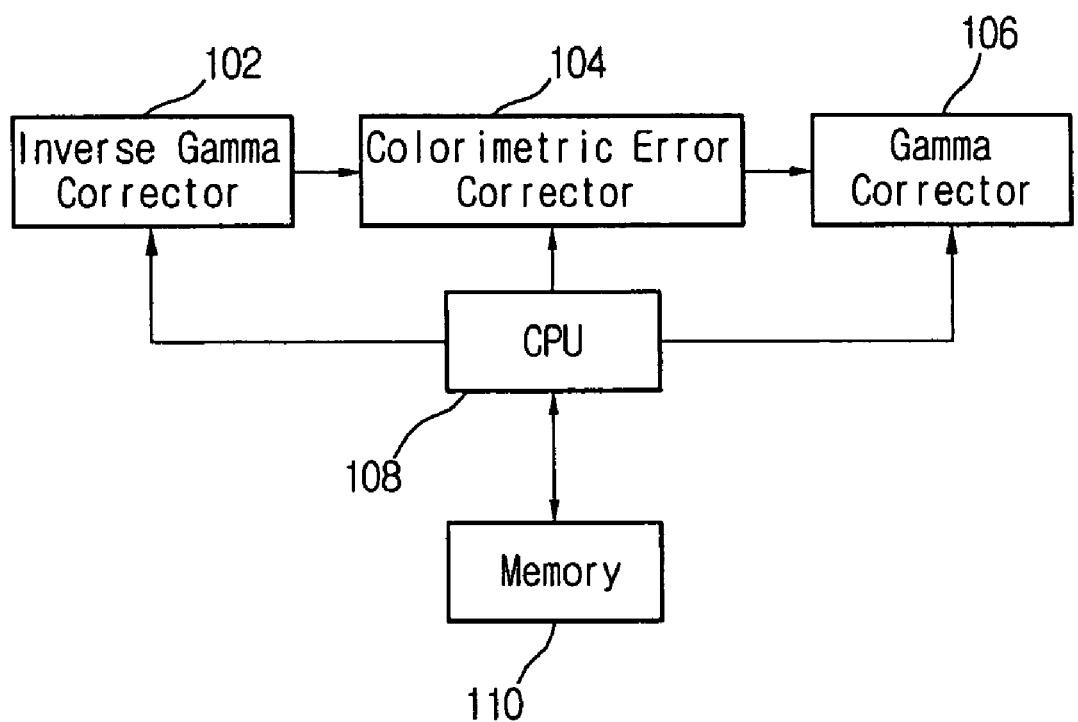
FIG. 6 is a schematic diagram showing a construction of a color reproduction correcting system in accordance with a first embodiment of the present invention.

FIG. 6 is a schematic diagram showing a color reproduction correction system according to a first embodiment of the present invention. As shown in FIG. 6, the color reproduction correction system 100 according to the first embodiment of the present invention can include an inverse gamma corrector 102 for performing inverse gamma correction (e.g., first) to an inputted video signal according to a signal source, a colorimetric error corrector 104 for correcting a colorimetric error of the inverse gamma-corrected signal corrected by the inverse gamma corrector 102, and a gamma corrector 106 for performing gamma correction (e.g., second) to the colorimetric error corrected signal corrected by the colorimetric error corrector 104 according to corresponding display elements. A CPU 108 is for controlling the inverse gamma corrector 102, the colorimetric error corrector 104, the gamma corrector 106 and a memory 110. The memory 110 is for storing signal source information and display element information provided by the CPU 108.

The inverse gamma corrector 102 preferably performs inverse gamma correction to the gamma-corrected signal (e.g., TV signal, component signal, PC signal or the like), for example, at a transmitter of a color television system. For example, gamma correction is performed to a NTSC signal of a TV signal with gamma value of 2.2. Accordingly, the signal to which gamma correction is performed by the inverse gamma corrector 102 can have a linear characteristic. The gamma corrector 106 preferably performs gamma correction to the signal corrected the colorimetric error corrector 104 with gamma value of the display element employed by the video display device.

In general, display element performs inverse gamma correction to a video signal with its own gamma value and displays it. In other words, a CRT, an LCD and a PDP have gamma values of 2.2, 2.4 and 1, respectively.

Accordingly, when a signal source is made for the related art video display device that does not employ preferred embodiments of a color reproduction correction system, the gamma correction with CRT gamma value of 2.2 is usually performed to make a video signal. Inverse gamma correction is performed to the video signal with the gamma value of the display element. In this case, if the LCD (e.g., gamma value of 2.4) or PDP (e.g., gamma value of 1) other than CRT as a display element is used, inverse gamma correction is performed to the video to which gamma correction was performed with gamma value of 2.2 at a transmitter. So, the video that has non-linearity instead of a linearity is displayed on the display element.

The gamma corrector 106 performs gamma correction to a video signal with the gamma value of the display element so that the video can be displayed with a linearity caused by the inverse gamma correction with the gamma value of the display when the video signal corrected with gamma correction is displayed on the display element.

The CPU 108 preferably has information on signal sources of a video signal and display elements. However the present invention is not intended to be so limited. For example, the information could be stored elsewhere so long as it is accessible to the CPU 108. For example, an OSD screen can be used to allow a user to select each of signal sources so that the CPU 108 recognizes the type (e.g., kind) of the selected signal source. In other words, the selection menu for each signal source is provided on an OSD screen. If the user selects one item for a specific signal source in the menu for signal sources, the CPU 108 recognizes a specific signal source and finds out the kind of the corresponding signal source. Alternatively, a remote controller has buttons to select each of the signal sources. If the user selects one of these buttons, the CPU 108 recognizes a specific signal source and determines the kind of the corresponding signal source.

On the other hand, generally, an output terminal has a plurality of output ports to be coupled to a plurality of display elements. Here, the CPU 108 can recognize the output port of the plurality of output ports, which is coupled to the display element, so that the kind of the display element can be found easily. For example, if output ports 1, 2 and 3 are allocated to CRT, LCD and PDP respectively and a PDP display element is coupled to the output port 3, the CPU 108 can recognize that the kind of the display element employed now is PDP.

The CPU 108 preferably reads the gamma value corresponding to the coupled signal source from the memory 110 according to the kind of the found signal source and sends the gamma value to the inverse gamma corrector 102. Thus, the CPU 108 can control the inverse gamma corrector 102 to perform inverse gamma correction to the video signal with the gamma value of the found signal source.

The CPU 108 preferably reads the gamma value corresponding to the connected display element from the memory 110 according to the kind of the found display element and sends the gamma value to the gamma corrector 106. Thus, the CPU 108 can control the gamma corrector 106 to perform gamma correction to the video signal corrected by the colorimetric error corrector 104 with the gamma value of the found display element.

The CPU 108 can read the signal source information and the display element information from the memory 110 according to the kind of the found signal source and the kind of the found display element and sends the signal source information and the display element information to the colorimetric error corrector 104. Accordingly, the CPU 108 controls the colorimetric error corrector 104 to perform colorimetric error correction to the video signal.

To achieve this, it is desired that the signal source information and the display element information are determined ahead and deliberately stored. The signal source information can include the kind of a signal source, the gamma information of each signal source, the coordinate of reference white for each signal source, the coordinate of phosphor of each signal source or the like. The display element information can include the kind of a display element, the gamma information of each display element, the coordinate of reference white for each display element, the coordinate of phosphor of each display element or the like.

Here, the signal source is exemplified by a TV signal, a component signal, PC signal and the like. Of course, the TV signal is a NTSC signal, a PAL signal or any signal that can be used as a TV signal. The component signal is a DVD signal, a VTR signal, DTV signal or any signal that can be used as a component signal.

The display element is CRT, CDT, CPT, LCD, PDP, FED or any display element that currently or will be employed as a display element in a television system.

On the other hand, the colorimetric error corrector 104 performs matrix transformation to the signal source information and the display element information provided from the memory 110 and corrects colorimetric error under the control of the CPU 108. Here, the signal information represents coordinate of the reference white of signal source and coordinate of phosphor for the inputted video signal. The display information represents coordinate of the reference white and coordinate of phosphor for the currently employed display element.

Processes by which colorimetric error generated because of the difference between coordinates of reference white and phosphor of the signal source and those of the display element can be corrected according to preferred embodiments will now be described using matrix transformation. However, the present invention is not intended to be limited to matrix transformation.

Figure 7:
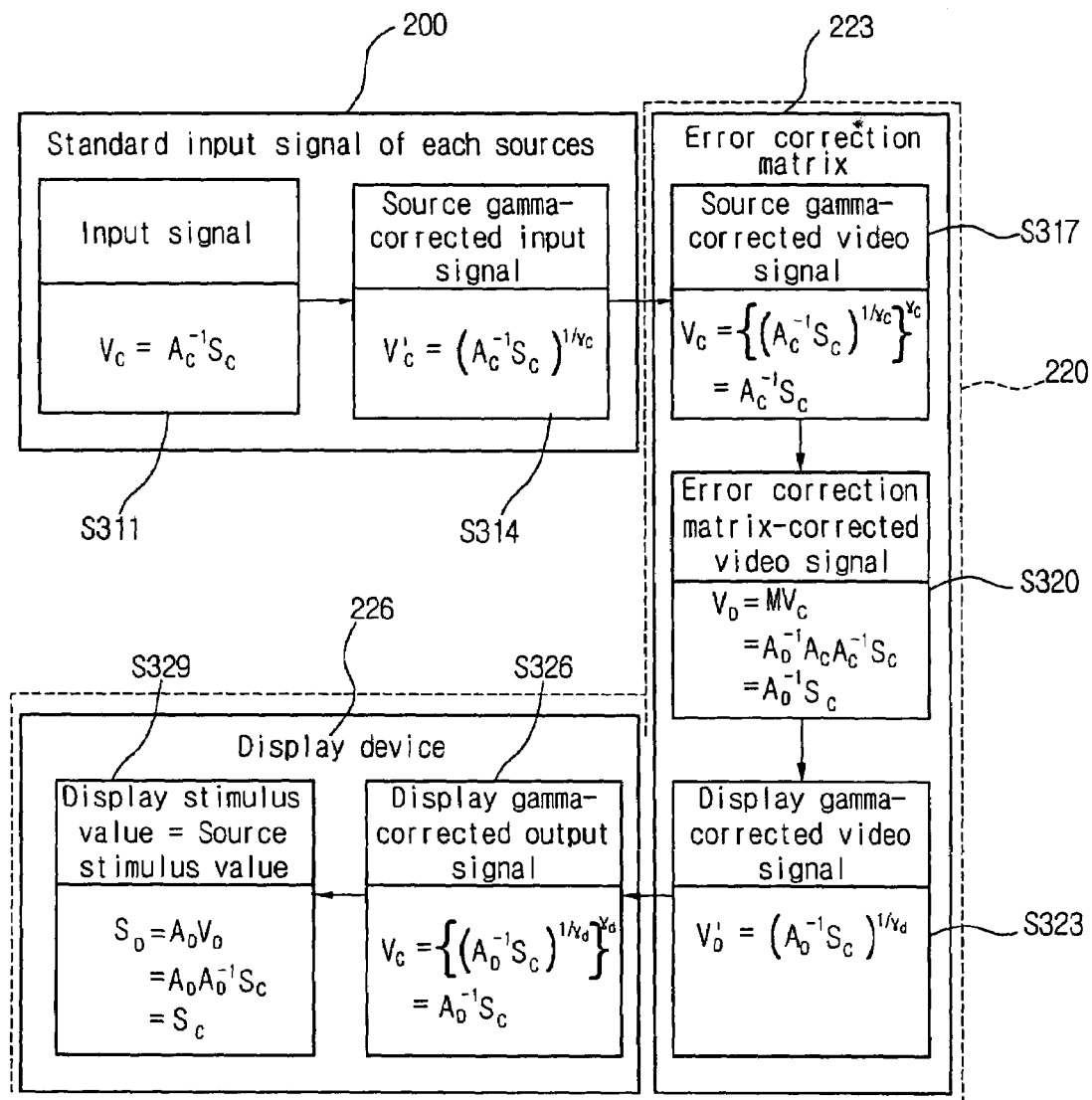
FIG. 7 is a schematic diagram showing a color reproduction method using a matrix conversion in a television system in accordance with a first embodiment.

FIG. 7 is a schematic view of color reproduction method using matrix transformation in a television system according to a first embodiment of the present invention. As shown in FIG. 7, the television system can include a transmitting camera 200 and a receiving video display device 220 that includes a color reproduction correction system 223 and a display element 226. An exemplary matrix transformation correction in the television system described above will now be described.

Color stimuli X, Y and Z for an object in the transmitting camera 100 is converted into color signals R, G and B (step S311). The color signals R, G and B converted at step S311 are then corrected with gamma correction using the gamma value of the corresponding signal source (step S314). For example, gamma correction is performed to an NTSC signal with gamma value of 2.2 and to a PAL signal with gamma value of 2.8. The signal to which gamma correction is performed at the step S314 can be transmitted through an antenna.

Figure 13A:
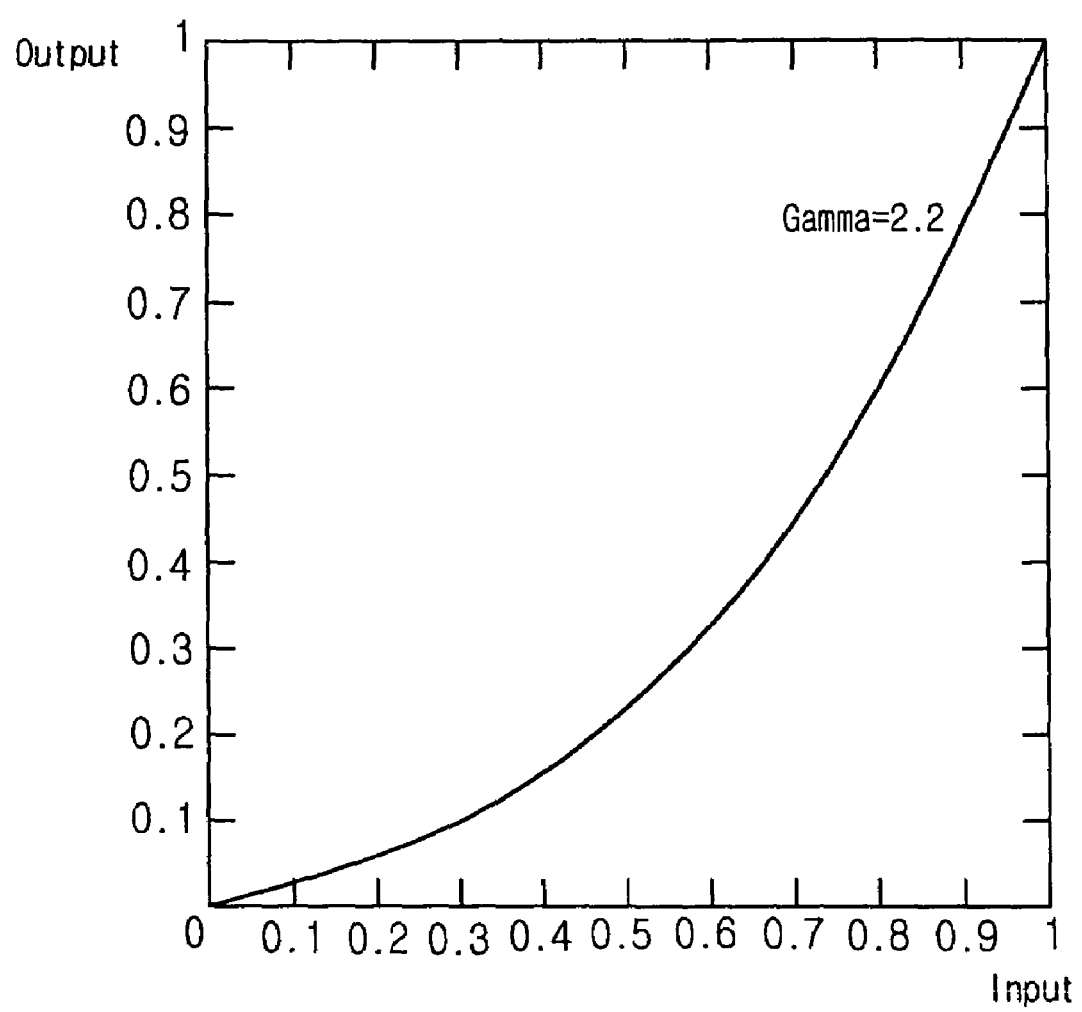
FIGS. 13A to 13D show exemplary gamma characteristic curves according to signal sources and display devices.
Figure 13B:
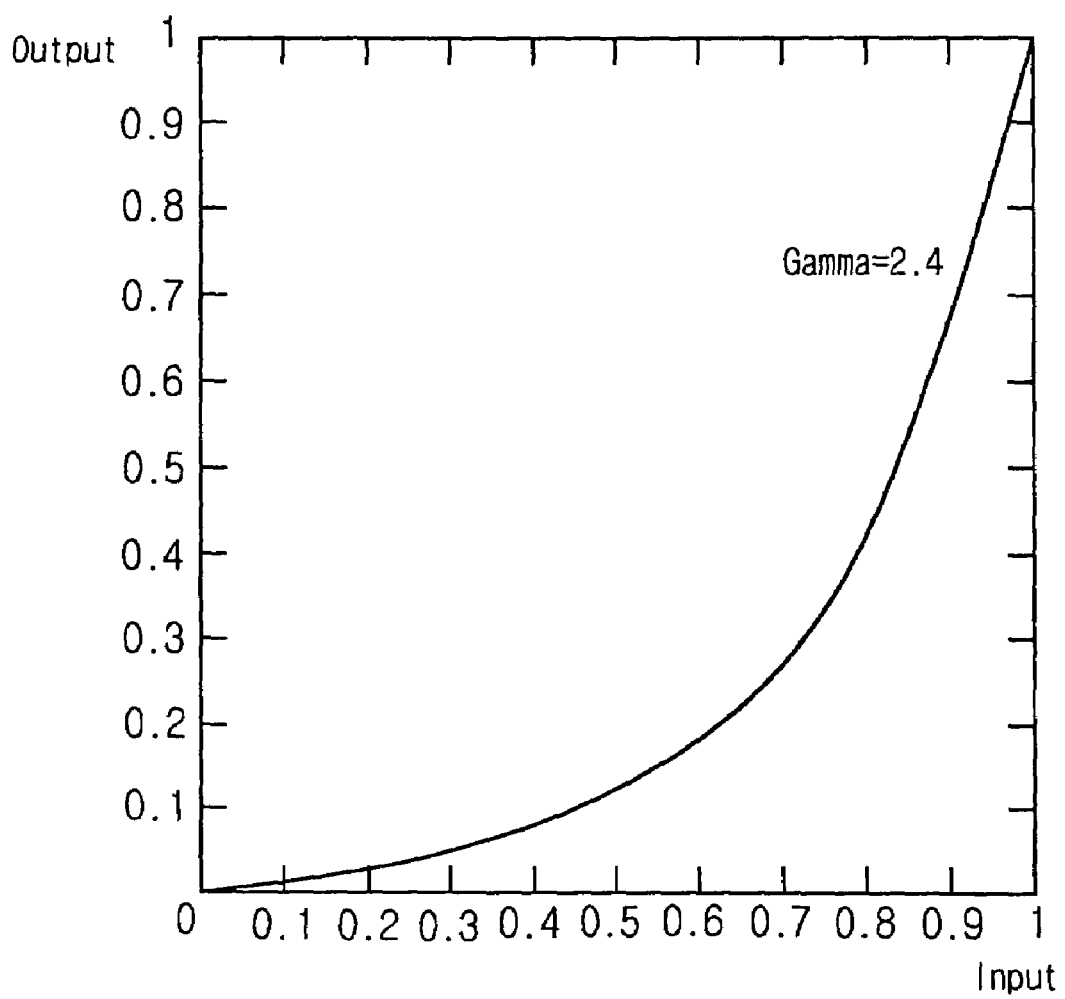

The gamma-corrected signal inputted to a color production system 223 of the video display device 220 is corrected with inverse gamma correction using the gamma value corresponding to the signal source and has linearity (step S317) (Refer to FIGS. 13A and 13B).

The colorimetric error caused from the difference between coordinates of reference white and phosphor of the signal source and those of the display element can be corrected using matrix transformation owing to signal modified or corrected with inverse gamma correction at step S317 (step S320).

Figure 13C:
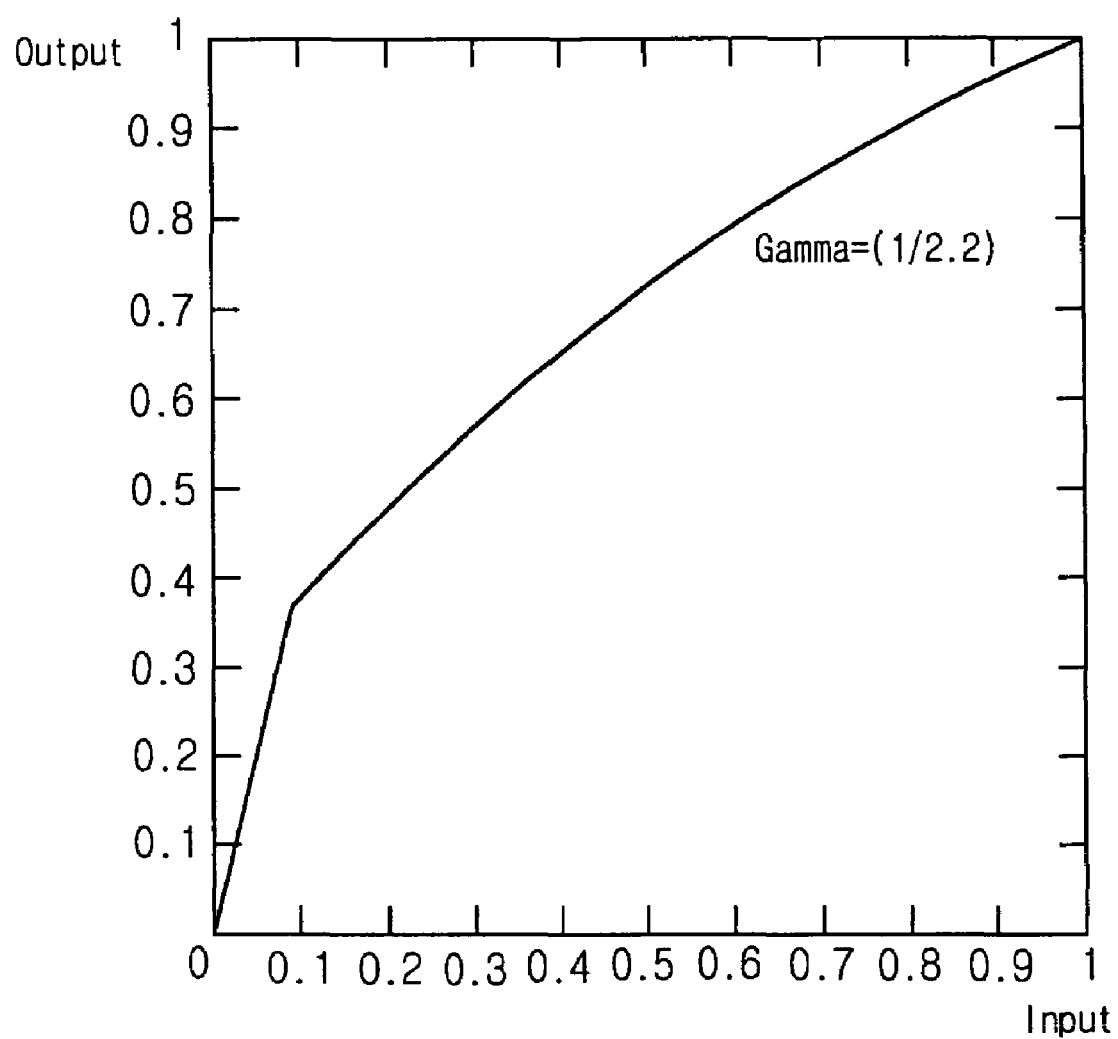
Figure 13D:
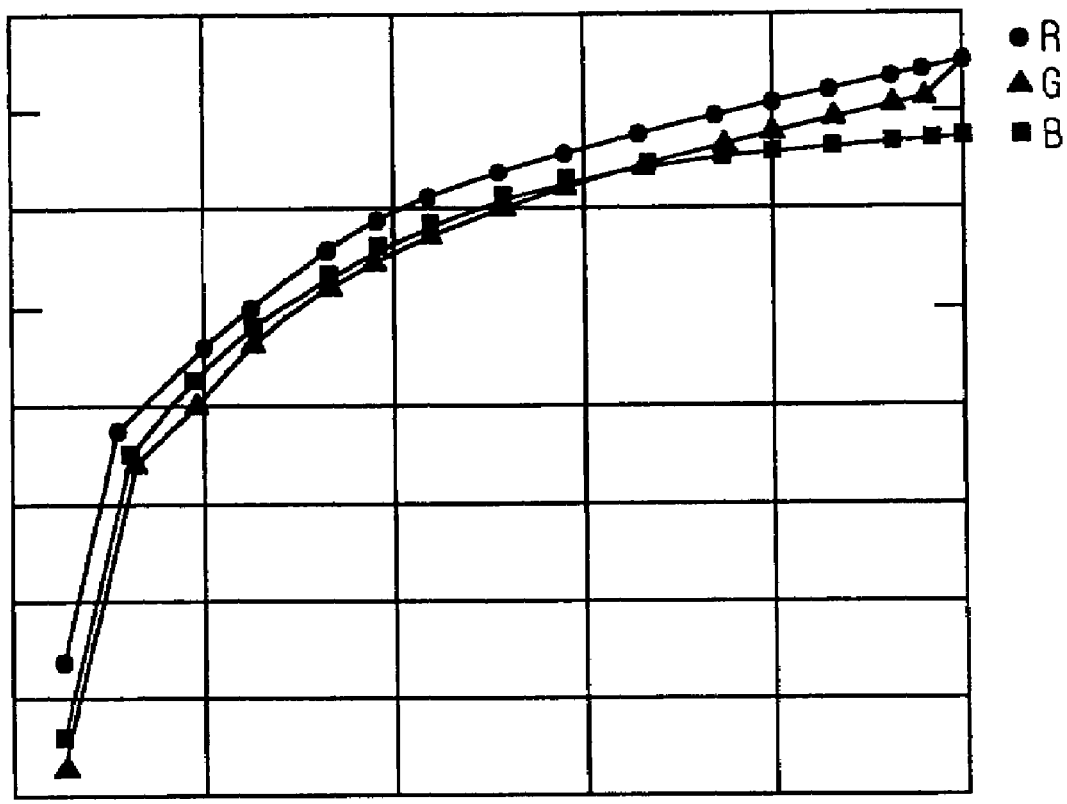

The colorimetric error signal corrected at step S320 can be corrected with gamma correction using the gamma value corresponding to the display element (step S323). For example, gamma correction can be performed in the CRT with gamma value of 1/2.2 (e.g., shown in FIG. 13C), in a LCD so as to make an inverse S curve and in a PDP so as to make linearity (e.g., shown in FIG. 13D).

The signal corrected with gamma correction at the step S323 can be applied to the display element 226 and corrected with inverse gamma correction with the gamma value of the display element (step S326). The signal corrected with inverse gamma correction at the step S326 can be recovered to color stimuli X, Y and Z of the original object. Preferably, inverse gamma correction is performed to the signal source by the color reproduction correction system, gamma correction is performed by the display element and colorimetric error between the signal source and the display element is corrected so that the color reproduction quality is enhanced and reliability of the video display device is improved.

Processes in which the color stimuli X, Y and Z obtained from the signal source using matrix transformation of the color reproduction correction system 223 are represented by the display element as is will now be described. A relationship exists between stimuli X, Y and Z and color signals R, G and B in a camera. First, the relation between stimuli X, Y and Z and color signals R, G and B in the transmitting camera 200 will be described. The coordinate of the phosphor and the coordinate of the reference white of the standard monitor to be applied to the camera are required to obtain color signals R, G and B from color stimuli X, Y and Z of original objects, for example, as shown in the camera of FIG. 5.

One process to find the matrix to convert the stimuli X, Y and Z into the color signals R, G and B in the camera can be as follows.

First, if sum of the three stimuli X, Y and Z is represented as T=X+Y+Z, the relation between the coordinates x, y and z and the stimuli X, Y and Z can be represented as Expression 1.

$$X = xT, Y = yT, Z = zT \qquad \text{[Expression 1]}$$

Here, the three stimuli X, Y and Z for R, G and B phosphors can be represented as Expression 2

$$X = X_{Rc} + X_{Gc} + X_{Bc}$$

$$Y = Y_{Rc} + Y_{Gc} + Y_{Bc}$$

$$Z = Z_{Rc} + Z_{Gc} + Z_{Bc} \qquad \text{[Expression 2]}$$

XRc, YRc and ZRc represent three stimuli X, Y and Z of R phosphor. XGc, YGc and ZGc represent three stimuli X, Y and Z of G phosphor. XBc, YBc and ZBc represent three stimuli X, Y and Z of B phosphor. Accordingly, the stimuli X, Y and Z of the phosphors can be represented as Expression 3 using Expression 1.

$$X = x_{Rc}T_{Rc} + x_{Gc}T_{Gc} + x_{Bc}T_{Bc}$$

$$Y = y_{Rc}T_{Rc} + y_{Gc}T_{Gc} + y_{Bc}T_{Bc}$$

$$Z = z_{Rc}T_{Rc} + z_{Gc}T_{Gc} + z_{Bc}T_{Bc} \qquad \text{[Expression 3]}$$

Here, xRc, yRc and zRc represent a coordinate of R phosphor. xGc, yGc and zGc represent a coordinate of G phosphor. xBc, yBc and zBc represent a coordinate of B phosphor.

On the other hand, the sums TRc, TGc and TBc of the three stimuli of the R, G and B phosphors are represented as multiplication of channel gains KRc, KGc and KBc and R, G and B stimuli as shown in Expression 4.

$$T_{Rc} = X_{Rc} + Y_{Rc} + Z_{Rc} = K_{Rc}R$$

$$T_{Gc} = X_{Gc} + Y_{Gc} + Z_{Gc} = K_{Gc}G$$

$$T_{Bc} = X_{Bc} + Y_{Bc} + Z_{Bc} = K_{Bc}B \qquad \text{[Expression 4]}$$

If Expression 4 is substituted in Expression 3, the relation between R, G and B stimuli and X, Y, Z stimuli can be represented as Expression 5.

$$X = x_{Rc}K_{Rc}R + x_{Gc}K_{Gc}G + x_{Bc}K_{Bc}B$$

$$Y = y_{Rc}K_{Rc}R + y_{Gc}K_{Gc}G + y_{Bc}K_{Bc}B$$

$$Z = z_{Rc}K_{Rc}R + z_{Gc}K_{Gc}G + z_{Bc}K_{Bc}B \qquad \text{[Expression 5]}$$

When the stimuli of the reference white are XW, YW and ZW respectively, the channel gains KRc, KGc and KBc for the R, G and B phosphors are preferably adjusted so that R=G=B=1.

Accordingly, when R=G=B=1 in Expression 5 and the stimuli are normalized as YW=1, the stimuli of the reference white can be represented as Expression 6.

$$X_W = \frac{x_W}{y_W} = x_{Rc}K_{Rc} + x_{Gc}K_{Gc} + x_{Bc}K_{Bc} \qquad \text{[Expression 6]}$$

$$Y_W = 1 = y_{Rc}K_{Rc} + y_{Gc}K_{Gc} + y_{Bc}K_{Bc}$$

$$Z_W = \frac{z_W}{y_W} = z_{Rc}K_{Rc} + z_{Gc}K_{Gc} + z_{Bc}K_{Bc}$$

When Expression 6 is represented in matrix form, Expression 6 can be represented as Expression 7.

$$\begin{bmatrix} \frac{x_W}{y_W} \\ 1 \\ \frac{z_W}{y_W} \end{bmatrix} = \begin{bmatrix} x_{Rc} & x_{Rc} & x_{Bc} \\ y_{Rc} & y_{Gc} & y_{Bc} \\ z_{Rc} & z_{Bc} & z_{Bc} \end{bmatrix} \begin{bmatrix} K_{Rc} \\ K_{Gc} \\ K_{Bc} \end{bmatrix} \qquad \text{[Expression 7]}$$

Therefore, the channel gains KRc, KGc and IBc of R, G and B of the camera 200 can be obtained from Expression 7. The channel gains KRc, KGc and KBc are represented in matrix form as Expression 8.

$$\begin{bmatrix} K_{Rc} \\ K_{Gc} \\ K_{Bc} \end{bmatrix} = \frac{1}{y_W} \begin{bmatrix} x_{Rc} & x_{Gc} & x_{BC} \\ y_{Rc} & y_{Gc} & y_{Bc} \\ z_{Rc} & z_{Gc} & z_{Bc} \end{bmatrix}^{-1} \begin{bmatrix} x_W \\ y_W \\ z_W \end{bmatrix} \qquad \text{[Expression 8]}$$

Accordingly, the channel gains can be found from coordinates x, y and z of the phosphor and the reference white to be used in the display element.

Meanwhile, in camera 200, the conversion relationship from the color stimuli X, Y and Z of the original object into the color signal R, G and B can be established from the relations above and represented in matrix form as Expression 9.

$$\begin{bmatrix} R \\ G \\ B \end{bmatrix} = \begin{bmatrix} K_{Rc} & 0 & 0 \\ 0 & K_{Gc} & 0 \\ 0 & 0 & K_{Bc} \end{bmatrix}^{-1} \begin{bmatrix} x_{Rc} & x_{Gc} & x_{Bc} \\ y_{Rc} & y_{Gc} & y_{Bc} \\ z_{Rc} & z_{Gc} & z_{Bc} \end{bmatrix}^{-1} \begin{bmatrix} X \\ Y \\ Z \end{bmatrix} \qquad \text{[Expression 9]}$$

As a result, Expression 9 preferably represents the color signals R, G and B made by the camera 200.

A relationship between color signals R, G and B and color stimuli X, Y and Z exists in a display element. The relationship between color signals R, G and B and color stimuli X, Y and Z in the display element 226 is preferably the same as the inverse process of the process of generating R, G and B signals in the camera.

In other words, the R, G and B channel gains can be found from the coordinate of the phosphor and the coordinate of the reference white of the display element 226 to be employed in the video display device. Further, the conversion matrix from the channel gains and the coordinate of the display phosphor into X, Y and Z stimuli can be obtained.

First, the relation between the color signals R, G and B and the stimuli X, Y and Z in the display element 226 can be represented as Expression 10 like the camera.

$$X = x_{Rc}K_{Rc}R + x_{Gd}K_{GD}G + x_{Bd}K_{Bd}B$$

$$Y = y_{Rd}K_{Rd}R + y_{Gd}K_{Gd}G + y_{Bd}K_{Bd}B$$

$$Z = z_{RD}K_{Rd}R + z_{Gd}K_{Gd}G + z_{Bd}K_{Bd}B \quad \text{[Expression 10]}$$

Here, the channel gains KRd, KGd and KBd of the display element are the stimuli XW, YW and ZW for the reference white respectively when each channel stimuli R=G=B=1. The luminance of the reference white can be normalized as 1.

Accordingly, when R=G=B=1 and it is normalized as YW=1, the stimuli of the reference white can be described as Expression 11.

$$X_W = \frac{x_W}{y_W} = x_{Rd}K_{Rd} + x_{Gd}K_{Gd} + x_{Bd}K_{Bd} \quad \text{[Expression 11]}$$

$$Y_W = 1 = y_{Rd}K_{Rd} + y_{Gd}K_{Gd} + y_{Bd}K_{Bd}$$

$$Z_W = \frac{z_W}{Y_W} = z_{Rd}K_{Rd} + z_{Gd}K_{Ge} + z_{Bd}K_{Bd}$$

Expression 11 can be represented in matrix form as Expression 12.

$$\begin{bmatrix} \frac{x_W}{y_W} \\ 1 \\ \frac{z_W}{y_W} \end{bmatrix} = \begin{bmatrix} x_{Rd} & x_{Rd} & x_{Bd} \\ y_{Rd} & y_{Gd} & y_{Bd} \\ z_{Rd} & z_{Gd} & z_{Bd} \end{bmatrix} \begin{bmatrix} K_{Rd} \\ K_{Gd} \\ K_{Bd} \end{bmatrix} \quad \text{[Expression 12]}$$

Therefore, the channel gains KRd, KGd and KBd of R, G and B in the display element 226 can be determined in Expression 12.

Expression 12 can be represented as Expression 13.

$$\begin{bmatrix} K_{Rd} \\ K_{Gd} \\ K_{Bd} \end{bmatrix} = \frac{1}{y_W} \begin{bmatrix} x_{Rd} & x_{Gd} & x_{Bd} \\ y_{Rd} & y_{Gd} & y_{Bd} \\ z_{Rd} & z_{Gd} & z_{Bd} \end{bmatrix}^{-1} \begin{bmatrix} x_W \\ y_W \\ z_W \end{bmatrix} \quad \text{[Expression 13]}$$

Accordingly, it is determined that each of the channel gains of the display element can be found from the coordinate x, y and z of the phosphor and the coordinate x, y and z of the reference white. Meanwhile, the conversion matrix from R, G and B signals into the implemented X, Y and Z stimuli using channel gains and the coordinate of the phosphor is represented as Expression 14 based on Expression 10.

$$\begin{bmatrix} X \\ Y \\ Z \end{bmatrix} = \begin{bmatrix} x_{Rd} & x_{Gd} & x_{Bd} \\ y_{Rd} & y_{Gd} & y_{Bd} \\ z_{Rd} & z_{Gd} & z_{Bd} \end{bmatrix} \begin{bmatrix} K_{Rd} & 0 & 0 \\ 0 & K_{Gd} & 0 \\ 0 & 0 & K_{Bd} \end{bmatrix} \begin{bmatrix} R \\ G \\ B \end{bmatrix} \quad \text{[Expression 14]}$$

In summary, Expression 14 can represent the implemented colors of the display element that receives color signal input (e.g., video voltage signal).

Color reproduction correction can be performed in a color reproduction correction system. For example, the error correction matrix correction method to reduce colorimetric error of the implemented color caused by the difference between phosphors of the NTSC standard monitor and the display element can be described as follows.

First, when the coordinate of the reference white and the coordinate of the phosphor of the standard monitor of the transmitting camera 200 are given, the conversion relation can be represented as Expression 15.

$$\begin{bmatrix} R_c \\ G_c \\ B_c \end{bmatrix} = \begin{bmatrix} K_{Rc} & 0 & 0 \\ 0 & K_{Gc} & 0 \\ 0 & 0 & K_{Bc} \end{bmatrix}^{-1} \begin{bmatrix} x_{Rc} & x_{Gc} & x_{Bc} \\ y_{Rc} & y_{Gc} & y_{Bc} \\ z_{Rc} & z_{Gc} & z_{Bc} \end{bmatrix}^{-1} \begin{bmatrix} X_C \\ Y_c \\ Z_c \end{bmatrix} \quad \text{[Expression 15]}$$

$$= \left( \begin{bmatrix} x_{Rc} & x_{Gc} & x_{Bc} \\ y_{Rc} & y_{Gc} & y_{Bc} \\ z_{Rc} & z_{Gc} & z_{Bc} \end{bmatrix} \begin{bmatrix} K_{Rc} & 0 & 0 \\ 0 & K_{Gc} & 0 \\ 0 & 0 & K_{Bc} \end{bmatrix} \right)^{-1} \begin{bmatrix} X_c \\ Y_c \\ Z_c \end{bmatrix}$$

Expression 15 can be represented as Expression 16.

$$[V_c] = [V_c]^{-1}[S_c] \quad \text{[Expression 16]}$$

$$[V_c] = \begin{bmatrix} R_c \\ G_c \\ B_c \end{bmatrix}$$

$$[S_c] = \begin{bmatrix} X_c \\ Y_c \\ Z_c \end{bmatrix}$$

$$[A_c] = \begin{bmatrix} x_{Rc} & x_{Gc} & x_{Bc} \\ y_{Rc} & y_{Gc} & y_{Bc} \\ z_{Rc} & z_{Gc} & z_{Bc} \end{bmatrix} \begin{bmatrix} K_{Rc} & 0 & 0 \\ 0 & K_{Gc} & 0 \\ 0 & 0 & K_{Bc} \end{bmatrix}$$

Similarly, when the coordinate of the reference white and the coordinate of the phosphor of the display element are given, the conversion relation from the color signals R, G and B into color stimuli X, Y and Z is preferably represented as Expression 17 referring to Expression 14.

$$[S_d] = [A_d]^{-1}[V_d] \quad \text{[Expression 17]}$$

$$[S_d] = \begin{bmatrix} X_d \\ Y_d \\ Z_d \end{bmatrix}$$

$$[V_d] = \begin{bmatrix} R_d \\ G_d \\ B_d \end{bmatrix}$$

$$[A_d] = \begin{bmatrix} x_{Rd} & x_{Gd} & x_{Bd} \\ y_{Rd} & y_{Gd} & y_{Bd} \\ z_{Rd} & z_{Gd} & z_{Bd} \end{bmatrix} \begin{bmatrix} K_{Rd} & 0 & 0 \\ 0 & K_{Gd} & 0 \\ 0 & 0 & K_{Bd} \end{bmatrix} \quad \text{[Expression 18]}$$

Meanwhile, when the gamma value of the CRT is supposed to be 1 and the color stimulus of camera and the color stimulus of the display element are as Sc=Sd, Expression 19 can be determined from Expressions 16 and 18. Expression 19 can be represented as Expression 20.

$$[A_D][V_D] = [A_C][V_C] \quad \text{[Expression 19]}$$

$$[V_D] = [A_D]^{-1}[A_C][V_C] = [M][V_C] \quad \text{[Expression 20]}$$

In Expression 20, [M] represents matrix conversion. This matrix conversion can be represented as Expression 21, referring to Expressions 16 and 18.

$$[M] = [A_D]^{-1}[A_C]^{-1}[A_C]$$ [Expression 21]

$$= \left(\begin{bmatrix} x_{Rd} & x_{Gd} & x_{Bd} \\ y_{Rd} & y_{Gd} & y_{Bd} \\ z_{Rd} & z_{Gd} & z_{Bd} \end{bmatrix} \begin{bmatrix} K_{Rd} & 0 & 0 \\ 0 & K_{Gd} & 0 \\ 0 & 0 & K_{Bd} \end{bmatrix}\right)^{-1}$$

$$\begin{bmatrix} x_{RC} & x_{Gc} & x_{Bc} \\ y_{Rc} & y_{Gc} & y_{Bc} \\ z_{Rc} & z_{Gc} & z_{Bc} \end{bmatrix} \begin{bmatrix} K_{Rc} & 0 & 0 \\ 0 & K_{Gc} & 0 \\ 0 & 0 & K_{Bc} \end{bmatrix}$$

$$= \begin{bmatrix} K_{Rd} & 0 & 0 \\ 0 & K_{Gd} & 0 \\ 0 & 0 & K_{Bd} \end{bmatrix}^{-1} \begin{bmatrix} x_{Rd} & x_{Gd} & x_{Bd} \\ y_{Rd} & y_{Gd} & y_{Bd} \\ z_{Rd} & z_{Gd} & z_{Bd} \end{bmatrix}^{-1}$$

$$\begin{bmatrix} x_{Rc} & x_{Gc} & x_{Bc} \\ y_{Rc} & y_{Gc} & y_{Bc} \\ z_{Rc} & z_{Gc} & z_{Bc} \end{bmatrix} \begin{bmatrix} K_{Rc} & 0 & 0 \\ 0 & K_{Gc} & 0 \\ 0 & 0 & K_{Bc} \end{bmatrix}$$

As determined from Expression 21, the matrix conversion [M] can be found when the coordinate of the reference white and the coordinate of phosphor of the signal source and those of the displayed are given.

Accordingly, in the embodiment of the color reproduction correction system 100 shown in FIG. 6, if the coordinates of the reference white and the phosphor of the signal source and the coordinates of the reference white and the phosphor of the display element are deliberately stored, for example, in a table in a memory 110. The colorimetric error corrector 104 can correct colorimetric error through the matrix conversion using the signal source information and the display element information stored in the memory 110. To correct this colorimetric error, an inverse gamma corrector 102 can perform inverse gamma correction with the gamma value of a specific signal source to the signal corrected with gamma correction with the gamma value of the specific signal source at a transmitter so that the signal with linearity is generated.

The colorimetric error corrector 104 performs colorimetric error correction to the signal with linearity. The gamma corrector 106 performs gamma correction to the signal with the gamma value of a specific display element. Similarly, the gamma-corrected signal is corrected with inverse gamma correction at the display element so that video with linearity is displayed.

Accordingly, errors caused by the differences between gamma characteristics of the signal source and the display element, the differences between coordinates of the reference whites of the signal source and the display element and the differences between coordinates of the phosphors of the signal source and the display element can be removed. Thus, color reproduction efficiency and reliability of the system performance can be improved.

Further, the embodiment of the color reproduction correction system 100 shown in FIG. 6 can exclude a colorimetric error corrector 104 and only include an inverse gamma corrector 102, a gamma corrector 106, a CPU 108 and a memory 110. In this case, the color reproduction correction system 100 can overcome gamma difference between a signal source and a display element.

In other words, the inverse gamma corrector 102 performs inverse gamma correction for the signal source corresponding to the video signal to the inputted video signal so that a signal with linearity is outputted. Gamma correction for the display element employed now is performed to the signal with linearity inputted to gamma corrector 106. The corrected gamma signal is corrected with gamma correction at the display element so that the video with linearity is displayed. In this case, the gamma information on each signal source and the gamma information on each display element should be stored, for example in the memory 110.

Preferred embodiments of color reproduction correction methods and apparatus of a video display device that employs the color reproduction correction system when one signal source is inputted will now be described. Exemplary signal sources to be described include a TV signal, a component signal and PC signal.

Figure 8:
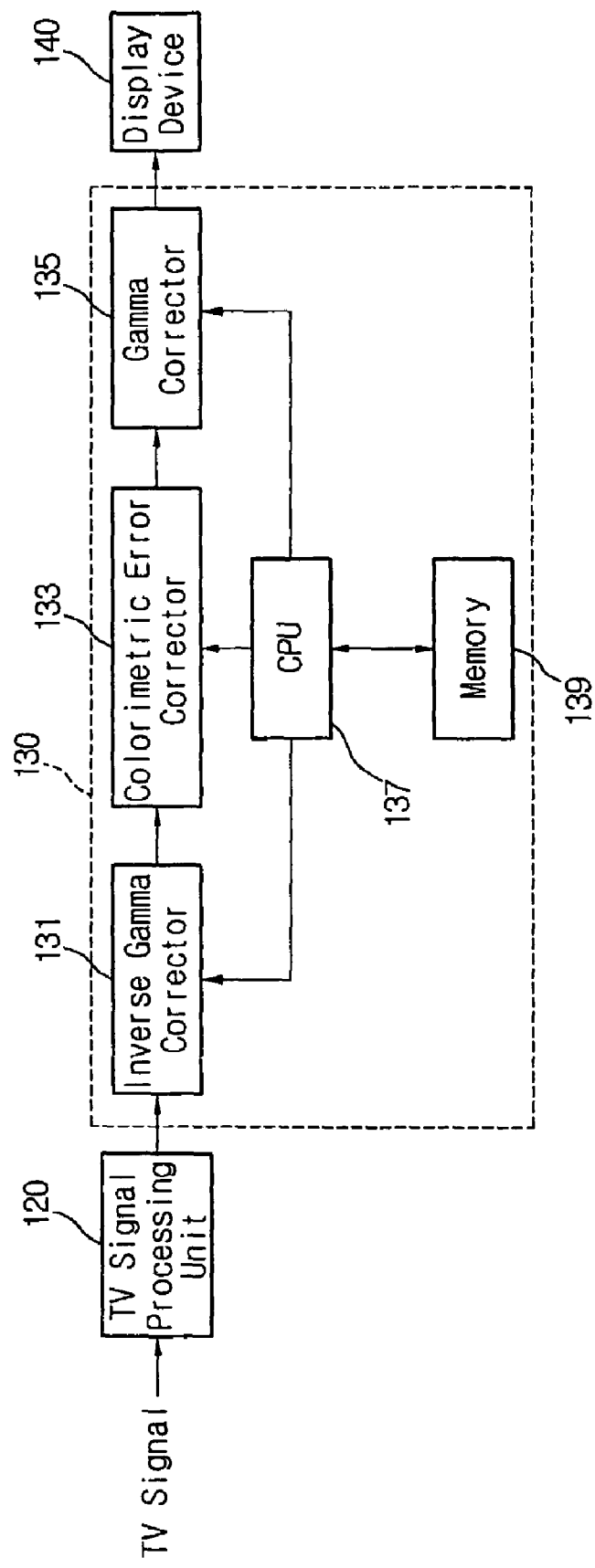
FIG. 8 is a schematic diagram showing a construction of a video display device with a color reproduction system when inputting TV signal according to a second embodiment of the present invention.

FIG. 8 is a schematic view illustrating a video display device that employs the color reproduction correction system when a TV signal is inputted according to a second embodiment of the present invention. As shown in FIG. 8, the video display device according to the second embodiment of the present invention can include a TV signal processing unit 120 for processing an inputted TV signal and outputting color signals R', G' and B', a color reproduction correction system 130 for performing color reproduction correction to the color signals R', G' and B' outputted from the TV signal processing unit 120 using TV signal source information and display element information, and a display element 140 for display a color reproduction signal corrected by the color reproduction correction system 130. Here, the TV signal is a signal that is adjusted with coordinates of a reference white and a phosphor of the TV signal source and corrected with gamma correction when generating a signal.

The TV signal processing unit 120 can be similar to the related art. Thus, the TV signal processing unit 120 can include a TV signal processor 10, an A/V switch 11, a 3D comb filter 12, a decoder 13, a video/synchronization processor 14, an ADC 15 and a video processor 16.

The color reproduction correction system 130 can include an inverse gamma corrector 131 for performing inverse gamma correction to a color signal outputted from the TV signal processing unit 120, a colorimetric error corrector 133 for correcting colorimetric error of the inverse gamma-corrected signal corrected by the inverse gamma corrector 131, a gamma corrector 135 for performing gamma correction to the colorimetric error corrected signal corrected by the colorimetric error corrector 133 according to the display element, a CPU 137 and a memory 139. The CPU 137 is for controlling the inverse gamma corrector 131, the colorimetric error corrector 133 and the gamma corrector 135, and a memory 139 is for storing TV signal source information and display element information provided by control of the CPU 137.

The memory 139 preferably stores signal information on the TV signal source and display element information on each display element. For example, if the TV signal source is NTSC signal, the memory 139 can store the gamma value of 2.2 for this and information on coordinates of reference white and phosphor of the NTSC signal. Or if the TV signal is PAL signal, the memory 139 can store the gamma value of 2.8 for this and information on coordinates of reference white and phosphor of the PAL signal. The display information can include at least the kind of each display element, coordinate information of reference white and phosphor of each display element, and gamma value.

The color reproduction correction in the video display device configured as above will be described. The inputted TV signal is processed by the TV signal processing unit 120 and converted into color signals R', G' and B'. The inverse gamma corrector 131 performs inverse gamma correction to the converted color signal based on the TV signal source. Accordingly, the signal outputted from the inverse gamma corrector 131 has linearity.

The colorimetric error corrector 133 performs colorimetric error correction to the inverse gamma-corrected signal with linearity. Here, the color error is corrected using coordinate of the reference white and coordinate of phosphor for the TV signal and coordinate of the reference white and coordinate of phosphor for the corresponding display element. This corrected colorimetric error signal is corrected with gamma correction by the gamma corrector 135 for the corresponding display element. The corrected signal is corrected with gamma correction by a display element 140 so that the signal with linearity is displayed.

Figure 9:
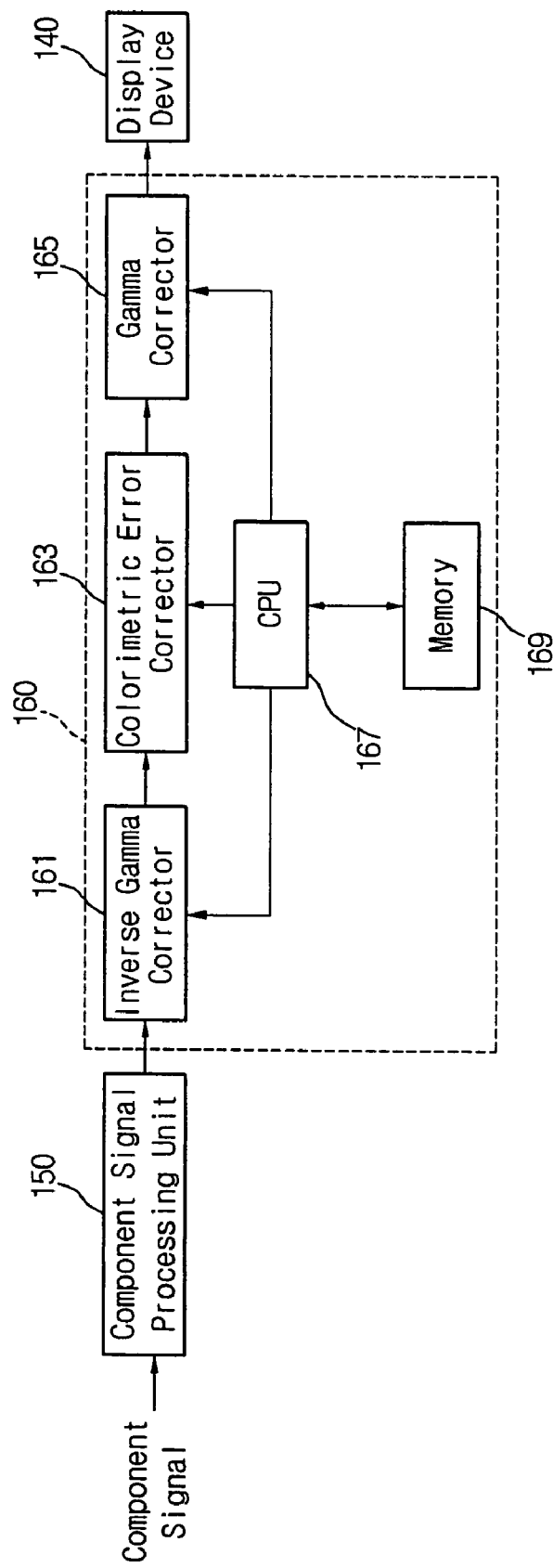
FIG. 9 is a schematic diagram showing a construction of a video display device with a color reproduction system when inputting component signal according to a third embodiment of the present invention.

FIG. 9 is a schematic diagram showing a video display device to which a color reproduction system is applied when inputting component signal according to a third embodiment of the present invention. As shown in FIG. 9, the video display device according to the third embodiment of the present invention can include a component signal processing 150 for processing an inputted component signal to output color signals (R', G', B'); a color reproduction correcting system 160 for correcting the color reproduction of the color signals (R', G', B') using a component signal source information and a display device information; and a display device 140 for displaying the color reproduction signals corrected at the color reproduction correcting system 160. Here, the component signal means a signal that is adjusted and gamma-corrected by a reference white and phosphor coordinate of the component signal source in a component signal production.

Figure 2:
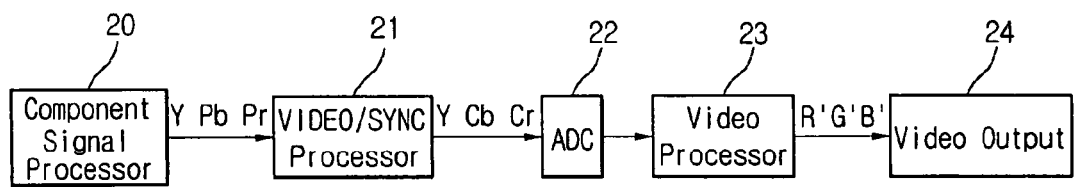
FIG. 2 is a diagram showing a related art video display device for processing component signal.

The component signal processing unit 150 can include the signal processor 20, the video/synchronization processor 21, the ADC 22, and the video processor 23, as shown in FIG. 2.

The color reproduction correcting system 160 can include an inverse gamma corrector 161 for performing an inverse gamma correction to the color signals (R', G', B') according to the component signal source, a colorimetric error corrector 163 for correcting a colorimetric error of the inverse gamma-corrected signals, a gamma corrector 165 for performing a gamma correction to the colorimetric error signal corrected by the colorimetric error corrector 163 according to a display device, a CPU 167 and a memory 169. The CPU 167 is for controlling the elements 161, 163 and 165, and a memory 169 is for storing the component signal source information and the display device information, which are provided by the control of the CPU 167.

At this time, the signal source information on respective component signal sources and the display device information on respective display devices are stored in the memory 169. For example, if the component signal source is a DVD signal, a gamma value of 2.222 (e.g., see ITU-Rec.709 of Table 1), a reference white and phosphor coordinate information on the DVD signal can be stored in the memory 169. The display device information can include at least the kinds of display devices, reference white and phosphor coordinate information on the display devices, and gamma values.

A color reproduction correcting method of the video display device of FIG. 9 will be described. The inputted component signal is converted into the color signals (R', G', B') by the component signal processing unit 150, and then the converted signals are inverse gamma-corrected based on the component signal source by the inverse gamma corrector 161. Accordingly, the signals outputted from the inverse gamma corrector 161 have a linearity.

The colorimetric corrector 163 corrects the colorimetric error of the inverse gamma corrected signal with a linearity. At this time, the colorimetric error is corrected using the reference white and phosphor coordinates of the component signal source and the reference white and phosphor coordinates of the corresponding display device.

The corrected colorimetric error signal is gamma-corrected based on the corresponding display device by the gamma corrector 165. The corrected signal is gamma-corrected by the display device 140 and a video having a linearity is displayed.

Figure 10:
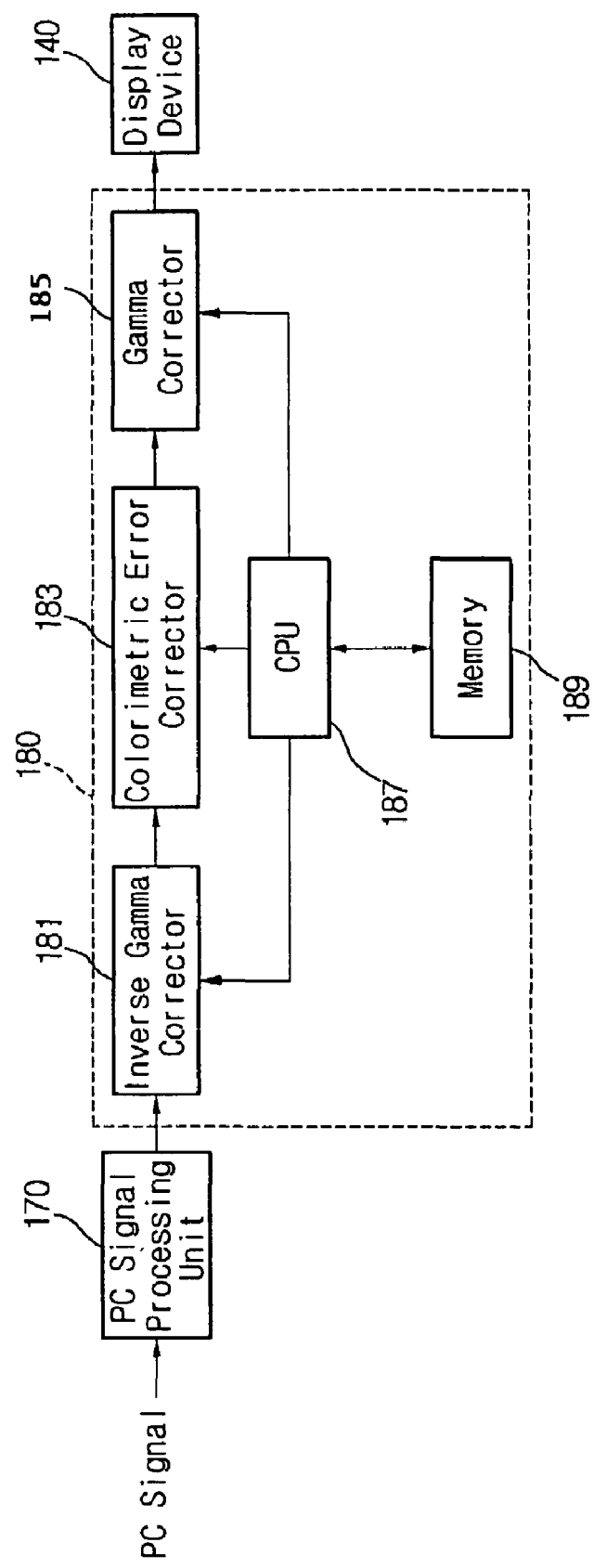
FIG. 10 is a schematic diagram showing a construction of a video display device with a color reproduction system when inputting PC signal according to a fourth embodiment of the present invention.

FIG. 10 is a schematic diagram showing a video display device to which a color reproduction system is applied when inputting PC signal according to a fourth embodiment of the present invention. As shown in FIG. 10, the video display device according to the fourth embodiment of the present invention can include a component signal processing 170 for processing an inputted PC signal to output color signals (R', G', B'), a color reproduction correcting system 180 for correcting the color reproduction of the color signals (R', G', B') using a PC signal source information and a display device information, and a display device 140 for displaying the color reproduction signals corrected at the color reproduction correcting system 180. Here, the component signal means a signal that is adjusted and gamma-corrected by coordinates of a reference white and a phosphor of the PC signal source in a PC signal production.

Figure 3:
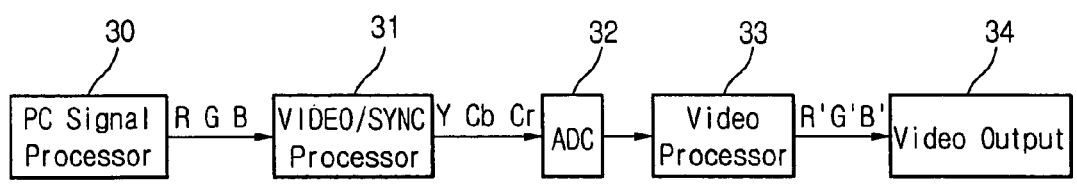
FIG. 3 is a diagram showing a related art video display device for processing PC signal.
Figure 4:
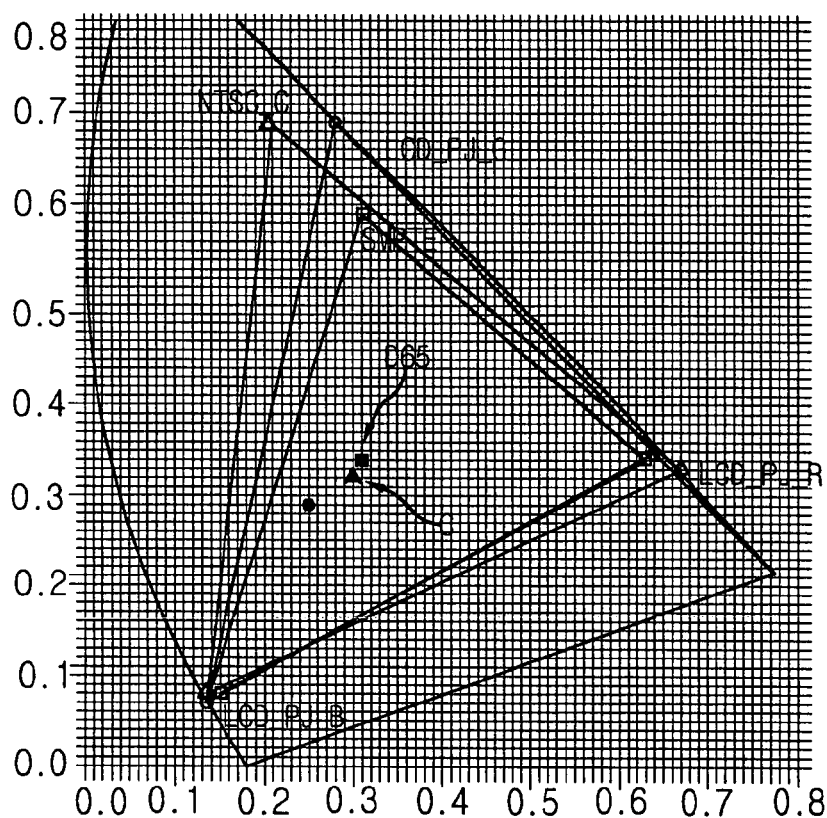
FIG. 4 shows a color reproduction area and a position of a reference white according to a general signal source and a general display device.

The component signal processing unit 170 can include the signal processor 30, the video/synchronization processor 31, the ADC 32, and the video processor 33, as shown in FIG. 3.

The color reproduction correcting system 180 can include an inverse gamma corrector 181 for performing an inverse gamma correction to the color signals (R', G', B') according to the PC signal source, a colorimetric error corrector 183 for correcting a colorimetric error of the inverse gamma-corrected signals, a gamma corrector 185 for performing a gamma correction to the colorimetric error signal corrected by the colorimetric error corrector 183 according to a display device, a CPU 187 and a memory 189. The CPU 187 is for controlling the elements 181, 183 and 185, and a memory 189 is for storing the PC signal source information and the display device information, which are provided by the control of the CPU 187.

At this time, the signal source information on respective PC signal sources and the display device information on respective display devices are stored in the memory 189. For example, if the PC signal source is a PC signal, its gamma value of 2.4 (e.g., see sRGB standard of Table 1), a reference white and phosphor coordinate information on the PC signal can be stored in the memory 189. The display device information can include at least the kinds of display devices, reference white and phosphor coordinate information on the display devices, and gamma values.

A color reproduction correcting method of the video display device of FIG. 10 will be described. The inputted PC signal is converted into the color signals (R', G', B') by the component signal processing unit 170, and then the converted signals are inverse gamma-corrected based on the PC signal source by the inverse gamma corrector 181. Accordingly, the signals outputted from the inverse gamma corrector 181 have a linearity.

The colorimetric corrector 183 corrects the colorimetric error of the inverse gamma-corrected signal with a linearity. At this time, the colorimetric error is corrected using the coordinates of the reference white and phosphor of the PC signal source and those of the reference white and phosphor coordinates of the corresponding display device.

The corrected colorimetric error signal is gamma-corrected based on the corresponding display device by the gamma corrector 185. The corrected signal is gamma-corrected by the display device 140 and a video having a linearity is displayed.

Figure 11:
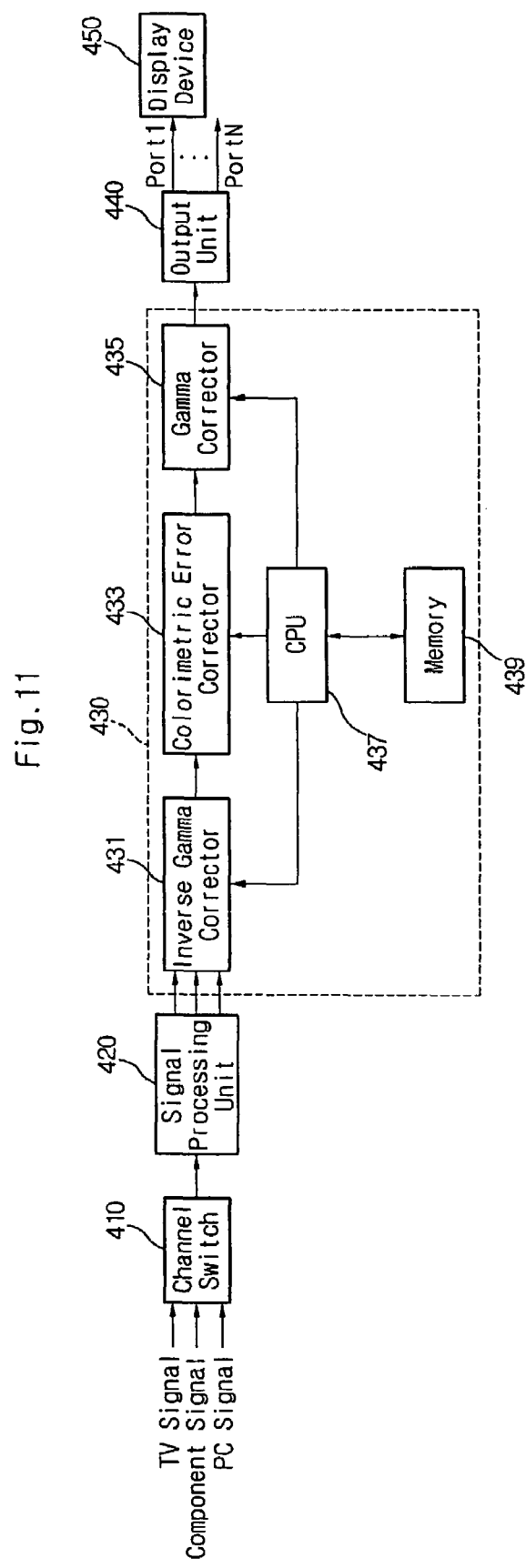
FIG. 11 is a schematic diagram showing a construction of a video display device with a color reproduction correcting system when inputting a plurality of signal sources according to a fifth embodiment of the present invention.

Preferred embodiments of present invention can provide a video display device capable of achieving the color reproduction correction even if any signal among a plurality of signal sources is inputted. FIG. 11 is a schematic diagram showing a video display device to which a color reproduction system is applied when inputting a plurality of signal sources according to a fifth embodiment of the present invention.

As shown in FIG. 11, the video display device according to the fifth embodiment of the present invention can include a channel switch 410 for selecting a channel for one signal among the plurality of input signals, a signal processing unit 420 for processing the selected signal, and a color reproduction correcting system 430 for correcting the color reproduction of the processed signal using a signal source information and a display device information. A display device 450 is for displaying the signals corrected at the color reproduction correcting system 430 through an output unit 440.

The channel switch 410 is switched to select one channel among the plurality of signals (e.g., TV signal, component signal, PC signal, etc.). The channel switch 410 is preferably controlled by a CPU 437. In other words, as described above, the CPU 437 recognizes a user's selection of the signal source and causes the channel switch 410 to select the signal corresponding to the user's selection. For example, in case the signal source recognized by the CPU 437 is TV signal, the channel switch 410 selects a channel corresponding to the TV signal and the selected TV signal is inputted to the signal processing unit 420.

The signal processing unit 420 processes the plurality of input signals, e.g., TV signal, component signal, PC signal, etc., and then converts them into color signals (R', B', G'). Accordingly, it is desired that the signal processing unit 420 include all of the TV signal processing unit 120 of FIG. 8, the component signal processing unit 150 of FIG. 9 and the PC signal processing signal unit 170 of FIG. 10.

Figure 1:
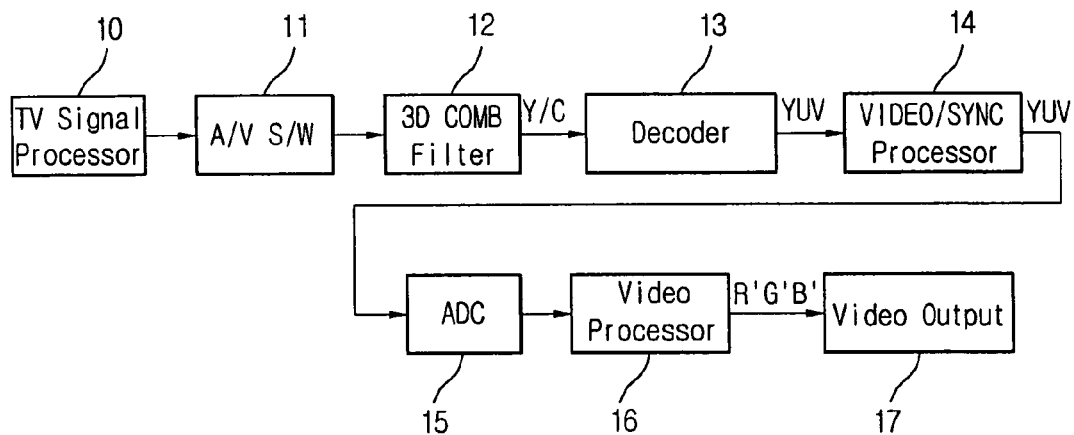
FIG. 1 is a diagram showing a related art video display device for processing TV signal.

As shown in FIG. 1, the TV signal processing unit 120 can include the TV signal processor 10, the A/V switch 11, the 3D comb filter 12, the decoder 13, the video/synchronization processor 14, the ADC 15 and the video processor 16. The component signal processing unit 150 can include the signal processor 20, the video/synchronization processor 21, the ADC 22 and the video processor 23, as show in FIG. 2. Also, the PC signal processing unit 170 can include the PC signal processor 30, the video/synchronization processor 31, the ADC 32 and the video processor 33, as shown in FIG. 3.

The channel switched signal provided from the channel switch 410 is inputted to the signal processing unit 420 and converted into the color signals (R', G', B').

The color reproduction correcting system 430 preferably includes an inverse gamma corrector 431 for performing an inverse gamma correction to the color signals (R', G', B') using gamma information on the corresponding signal source, a colorimetric error corrector 433 for correcting a colorimetric error of the inverse gamma-corrected signals, and a gamma corrector 435 for performing a gamma correction to the colorimetric error signal corrected by the colorimetric error corrector 433 using gamma information on the display device. A CPU 437 can control the elements 410, 431, 433, 435 and 440, and a memory 439 can store the signal source information and the display device information, which are provided by the control of the CPU 437.

As described above, in case the user selects the signal source mode, for example using the remote controller or the OSD screen, the CPU 437 recognizes the selected signal source using the signal source mode. Additionally, the output unit 440 preferably includes a plurality of output ports Port1 to PortN to which respective display devices can be connected. At this time, specific display devices can be connected to corresponding allocated output ports Port1 to PortN, respectively. For example, a CRT, an LCD and a PDP can be connected to the output ports Port1, Port2 and Port3, respectively.

Accordingly, the CPU 437 can check the connected display device by recognizing a port to which the specific display device is connected. However, the present invention is not intended to be so limited as other display device recognition method and apparatus may be used.

In case a plurality of display devices are coupled to the respective output ports Port1 to PortN, the CPU 437 can recognize the display device that the user selects, for example, using the remote controller or the OSD screen. The color reproduction correcting system 430 uses the information on the selected display device, and the signals outputted from the color reproduction correcting system 430 can be displayed on the display device 450 selected by the user.

The CPU 437 controls the respective elements 410, 431, 433, 435 and 440 using the checked signal source and display device. In other words, the CPU 437 can provide the checked signal source to the channel switch 410 to allow the channel switch 410 to select the corresponding channel.

The CPU 437 reads out the gamma information on the corresponding signal source from the memory 439 based on the checked signal source and then controls the inverse gamma corrector 431 to perform the inverse gamma correction to them. The CPU 437 reads out the signal source information and the display device information from the memory 439 based on the checked signal source and the checked display device and then controls the colorimetric error corrector 433 to perform the colorimetric error correction to them. Additionally, the CPU reads out the gamma information on the corresponding display device from the memory 439 based on the checked display device and then controls the gamma corrector 435 to perform the gamma correction to them.

The memory 439 stores information that is used to allow the CPU to control the elements 410, 431, 433, 435 and 440. In other words, the memory 439 stores the signal source information and the display device information. For example, the respective signal source information can include at least the kinds of signal sources, the gamma information on the signal source, and the coordinates of respective reference white and phosphor of the signal sources. The respective display device information can include at least the kinds of display devices, the gamma information on the display devices, the respective reference white and phosphor coordinates of the display device. The display device can include CRT, CPT, CDT, LCD, PDP, FED, etc.

A color reproduction method of the video display device of FIG. 11 will now be described. First, a plurality of signals are inputted to the channel switch from an exterior (e.g., a transmission side). At this time, the channel switch 410 is switched to select a channel corresponding to one signal among the plurality of signals according to the signal source checked by the CPU 437.

The selected signal is inputted the signal processing unit 420. The signal processing unit 420 outputs the color signals (R', G', B').

The color signals are inputted to the inverse gamma corrector 431. Then, the inverse gamma corrector 431 performs an inverse gamma correction to the color signals using the gamma information on the signal source to thereby output the signal having a linearity.

The colorimetric corrector 433 corrects the colorimetric error of the inverse gamma-corrected signal with a linearity. At this time, the colorimetric error is corrected based on the reference white and phosphor coordinates of the signal source and the reference white and phosphor coordinates of the corresponding display device.

The corrected colorimetric error signal is gamma-corrected based on the gamma information on the corresponding display device by the gamma corrector 435. The gamma-corrected signal is transmitted through the output unit 440 to the corresponding display device and the video with a linearity is displayed thereon.

Accordingly, the video display device checks the signal source corresponding to the input signal and generates the signal having a linearity through the inverse gamma correction. Then, the video display device corrects the colorimetric error between the corresponding signal source and the checked display device. The resulting signal is gamma-corrected based on the gamma value of the checked display device, so that the color reproduction efficiency and the reliability of the video display device are improved.

Figure 12:
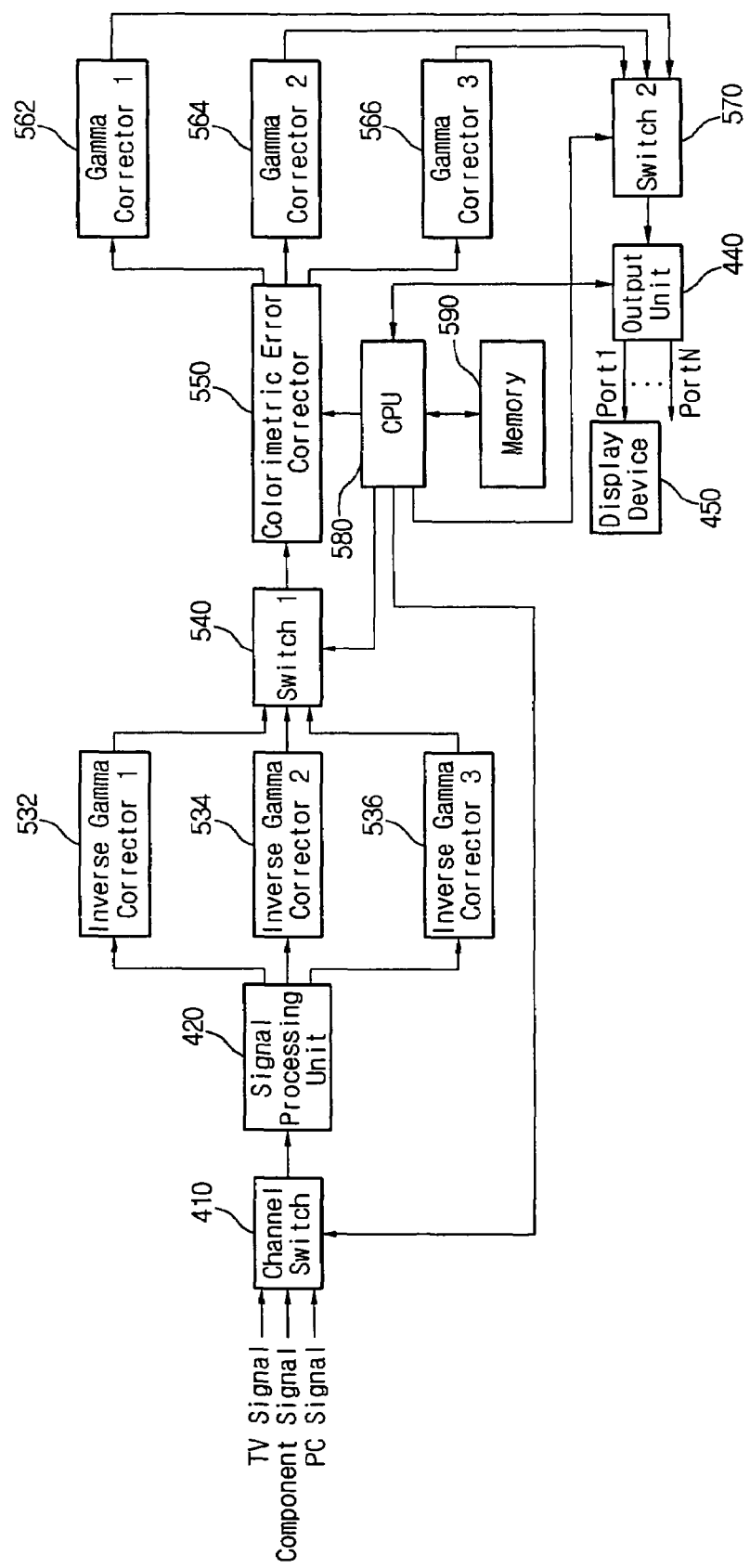
FIG. 12 is a schematic diagram showing a construction of a video display device according to a sixth embodiment of the present invention with a hardware color reproduction correction.

FIG. 12 is a schematic diagram showing a construction of a video display device according to a sixth embodiment of the present invention. In the sixth embodiment, the color reproduction correction can be implemented with hardware.

As shown in FIG. 12, the video display device according to the sixth embodiment can include a channel switch 410 for selecting a channel corresponding to one signal among the plurality of input signals, a signal processing unit 420 for processing the selected signal, and a plurality of inverse gamma correctors 532, 534 and 536 for performing an inverse gamma correction to the processed signals according to the signal sources. A first switch 540 is for selecting the inverse gamma-corrected signal corresponding to the signal source among the plurality of inverse gamma-corrected signals, and a colorimetric error corrector 550 is for correcting the colorimetric error of the signal selected by the first switch 540 using the signal source information and the display device information. A plurality of gamma correctors 562, 564 and 566 can perform the gamma correction to the colorimetric error signal, which is corrected at the colorimetric error corrector 550, according to the kinds of display devices. A second switch 570 is for selecting a signal corresponding to the display device among a plurality of gamma-corrected signals, and a display device 450 for displaying the signal selected by the second switch 570 through an output unit 440.

The video display device can further include a CPU 580 for checking the display device connected to the currently inputted signal source and controlling the respective elements 410, 540, 550 and 440 using the checked information and a memory 590. The memory 590 is for storing the signal source information and the display device information, which are provided to the colorimetric error corrector 550, under a control of the CPU 580.

The signal source information can include at least the kinds of signal sources and the reference white and phosphor coordinates of the signal sources, and the display device information can include at least the kinds of display devices and the reference white and phosphor coordinates of the display devices. While the memory 439 of FIG. 11 includes the gamma information on the signal sources and the gamma information on the display device, the memory 590 of FIG. 12 does not include such a gamma information. The reason is that the gamma information is implemented with hardware, i.e., the plurality of inverse gamma correctors 532, 534 and 536 and the plurality of gamma correctors 562, 564 and 566.

Operations of the video display device of FIG. 12 will now be described. First, the channel switch 410 is switched to select one of the input signals inputted according to the checked signal source provide from the CPU 580. The signal processing unit 420 processes the switched signal to output the color signals (R', B', G').

The color signals are inputted to the plurality of inverse gamma correctors 532, 534 and 536 and inverse gamma-corrected according to the kinds of signal sources. At this time, it is desired to provide the plurality of inverse gamma correctors 532, 534 and 536 preferably one for each type of signal source. However, the present invention is not intended to be so limited.

The inverse gamma-corrected signals are switched to allow the first switch 540 to select the signal corresponding to the signal source. For example, in case the signal selected by the user is PC signal, the CPU 580 recognizes the PC signal and provides it to the first switch 540. The first switch 540 is switched to select the inverse gamma-corrected signal corresponding to the recognized PC signal.

The colorimetric error corrector 550 corrects the colorimetric error of the switched signal using the signal source information and the display device information, which are provided from the memory 590. The colorimetric error signals corrected by the colorimetric error corrector 550 are inputted to the plurality of gamma correctors 562, 564 and 566, and the plurality of gamma correctors 562, 564 and 566 performs the gamma correction according to the kinds of display devices.

The plurality of gamma-corrected signals are inputted to the second switch 570 and the second switch 570 is switched to select the signal corresponding to the display device. At this time, the display device means a device that is coupled to the output unit, which is previously checked by the CPU 580 and is being used currently.

The signal switched by the second switch 570 is transmitted through the output unit to the display device 450 and displayed thereon. As described above, a memory capacity can be reduced since the respective gamma information on the signal sources and the display devices is implemented with hardware, instead of storing the information in the memory.

As described above, preferred embodiments of methods and apparatus for color correction and video display devices have various advantages. According to preferred embodiments of video display devices, in case different signal sources are used as an input source and different display devices are used as an output device, the improved reliability of products and increased playback accuracy can be obtained by solving the discord of the reference white and phosphor coordinates between the signal sources and the display devices based on the kinds of previously checked signal sources and the kinds of display devices. Further, the video with a linearity can be displayed on a corresponding display device by performing the inverse gamma correction to both the inputted signal sources and the display devices. Thus, video distortion can be also reduced or prevented.

In addition, since the inverse gamma correction to the signal source and the gamma correction to the display device can be implemented with hardware data storage requirements can be reduced. According to preferred embodiments of the present invention, whether any signal sources are inputted or any display device is employed, improved or optimal color reproduction is possible and the reliability of products can be improved.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A video display device comprising:
a first unit that processes an input signal provided from a transmission side to make a prescribed video signal;
a second unit that modifies a color reproduction of the video signal by using a signal source information and a display device information; and
a display unit coupled to the second unit and configured to display the modified color reproduction of the signal;
a storage unit to store inverse gamma information for each of a plurality of signal sources and gamma information for each of a plurality of display devices,
wherein the second unit comprises:
a plurality of first correction circuits that perform a first gamma correction to the input signal according to a type of the signal source,
a first switching circuit that correlates a signal corresponding to a predetermined signal source type from among the first corrected gamma signals, wherein the predetermined signal source type is determined by at least one of user operation, a signal source mode selected by a user and prescribed identification information,
an error correction circuit for correcting colorimetric error with respect to the correlated signal and to provide a corrected colorimetric error signal,
a plurality of second correction circuits that perform a second gamma correction on the corrected colorimetric error signal according to a type of the display device, and
a second switching circuit that correlates a signal corresponding to a predetermined display device type from among the gamma-corrected signals.

2. The video display device according to claim 1, wherein the first gamma correction is at least one of a gamma correction and an inverse gamma correction.

3. The video display device according to claim 1, wherein the second gamma correction is at least one of a gamma correction and an inverse gamma correction.

4. The video display device according to claim 1, wherein the input video signal corrected by a first correction circuit has a linear gamma characteristic.

5. A video display device, comprising:
an input signal processor that modifies a signal provided from a transmission side to make a predetermined video signal;
a plurality of first gamma correctors that operate on the processed video signal according to types of signal sources;
a first switching circuit that correlates a signal corresponding to a predetermined signal source type from among the first corrected gamma signals, wherein the predetermined signal source type is determined by at least one of user operation, a signal source mode selected by a user and prescribed identification information;
an error correction circuit for correcting colorimetric error with respect to the correlated signal;
a plurality of second gamma correctors that operate on the corrected colorimetric error signal according to types of display devices, wherein the colorimetric error is corrected by a matrix conversion between the signal source type and the display device type;
a second switching circuit that correlates a signal corresponding to a predetermined display device type from among the gamma-corrected signals; and
a display that displays the signal correlated by the second switching circuit.

6. The video display device according to claim 5, further comprising a selector coupled to a front end of the processor that switches a channel to select a corresponding input signal provided from the transmission side.

7. The video display device according to claim 5, wherein the predetermined signal source type is determined by at least one of user operation, a signal source mode selected by a user and prescribed identification information.

8. The video display device according to claim 5, wherein the first gamma correction is an inverse gamma correction and wherein the corrected input video signal by the inverse gamma correction has a linear gamma characteristic.

9. The video display device according to claim 5, wherein the predetermined display device type is determined by at least one of a display device connected to the plurality of second gamma correctors, user operation and prescribed identification information.

10. The video display device according to claim 5, wherein the colorimetric error is corrected by a matrix conversion between the signal source type and the display device type.

11. A video display method comprising:
processing an input signal provided from a transmission side to make a predetermined video signal using an input signal processor;
selecting a channel corresponding to the input signal provided from the transmission side;
performing a first gamma correction to the processed video signal according to kinds of signal sources using a plurality of first gamma correctors;
performing first selecting a signal corresponding to a predetermined signal source among the first corrected gamma signals using a first switching circuit;
correcting a colorimetric error with respect to selected signal by the first switching circuit using an error correction circuit;
performing a second gamma correction to the corrected colorimetric error signal according to kinds of display devices using a plurality of second gamma correctors;
performing second selecting a signal corresponding to a predetermined display device type among the second corrected gamma signals using a second switching circuit; and
displaying the signal selected by the second switching circuit on a display unit.

* * * * *